United States Patent [19]
Uchibori et al.

[11] Patent Number: 5,666,015
[45] Date of Patent: Sep. 9, 1997

[54] ELECTRIC MOTOR FOR A COMPRESSOR WITH A ROTOR WITH COMBINED BALANCE WEIGHTS AND OIL SEPARATION DISK

[75] Inventors: Masaharu Uchibori, Ohra; Keijiro Igarashi, Ohta; Tomonori Kinoshita, Kumagaya; Takashi Miyauchi, Ohta; Kazuhiko Arai, Oizumi, all of Japan

[73] Assignee: Sanyo Electric Co., Ltd., Osaka, Japan

[21] Appl. No.: 231,197

[22] Filed: Apr. 21, 1994

[30] Foreign Application Priority Data

| Apr. 30, 1993 | [JP] | Japan | 5-124714 |
| Apr. 30, 1993 | [JP] | Japan | 5-124715 |
| May 13, 1993 | [JP] | Japan | 5-134149 |
| May 18, 1993 | [JP] | Japan | 5-138893 |

[51] Int. Cl.$^6$ ........................... H02K 1/22
[52] U.S. Cl. .................... 310/261; 310/42; 310/156
[58] Field of Search ................. 310/156, 62, 63, 310/217, 218, 261, 42

[56] References Cited

U.S. PATENT DOCUMENTS

| 4,144,469 | 3/1979 | Miyashita | 310/156 |
| 4,411,341 | 10/1983 | Schultz | 188/310 |
| 4,454,438 | 6/1984 | Yamashita et al. | 310/162 |
| 4,486,679 | 12/1984 | Jones | 310/218 |
| 4,795,936 | 1/1989 | Crosetto et al. | 310/156 |
| 5,175,461 | 12/1992 | Zigler et al. | 310/156 |
| 5,258,678 | 11/1993 | Futami | 310/156 |
| 5,274,288 | 12/1993 | Stefansky | 310/90 |
| 5,369,325 | 11/1994 | Nagate et al. | 310/156 |

FOREIGN PATENT DOCUMENTS

| 0 538 472 | 4/1993 | European Pat. Off. . |
| 5 705 2359 | 3/1982 | Japan . |
| 58-160587 | 9/1983 | Japan . |
| 59-72969 | 4/1984 | Japan . |
| 2 246 748 | 10/1990 | Japan . |
| 4 185 247 | 7/1992 | Japan . |
| 2 217 924 | 11/1989 | United Kingdom . |

*Primary Examiner*—Thomas M. Dougherty
*Assistant Examiner*—Jonathan Link
*Attorney, Agent, or Firm*—Darby & Darby

[57] ABSTRACT

A rotor of an electric motor for a compressor which can prevent the generation of an eddy current, reduce the flux leakage between adjacent magnetic poles, thereby enhancing the operation efficiency of the motor and reducing the size of the compressor. A first end surface member formed from a nonmagnetic material, a second end surface member formed from a nonmagnetic member and a rotor core are integrally caulked by a caulking member. The rotor core is provided with a gap for preventing the short circuit of the magnetic flux caused between adjacent magnetic poles. The gap communicates with a through hole into which the caulking member is inserted.

7 Claims, 28 Drawing Sheets

Pattern1

Pattern3

Pattern2

Pattern4

Pattern5

Pattern6

ELECTRIC MOTOR FOR A COMPRESSOR WITH A ROTOR WITH COMBINED BALANCE WEIGHTS AND OIL SEPARATION DISK

BACKGROUND OF THE INVENTION

The present invention relates to the structure of the rotor of an electric motor for a compressor.

Conventional rotors of electric motors for a compressor generally has the following structures.

The rotor described in Japanese Patent Laid-Open No. 52359/1982 is produced by inserting a laminated rotor core and magnetic materials into a metal pipe, and integrally die-casting these elements.

The rotor described in Japanese Patent Laid-Open No. 246748/1990 is produced by inserting a laminated rotor core and magnetic materials into a metal pipe in the same way as in the above-described rotor, and integrally clamping these elements. At the time of clamping, an air gap portion is provided between adjacent magnetic materials so as to safely separate the poles of the magnetic materials, thereby enhancing the efficiency.

Another rotor is described in Japanese Patent Publication No. 23584/1985. In this rotor, magnetic materials which constitute the magnetic poles are inserted (embedded) into the rotor core. This rotor is used for a synchronous motor which is capable of self starting.

Japanese Patent Laid-Open No. 185247/1992 discloses another rotor, which is composed of magnetic materials embedded into the salient pole portions of the rotor core Which has a salient-pole structure. The rotor core with the magnetic materials embedded therein and end surface members for covering both end surface thereof are arranged, and a rotary shaft is integrally press-fitted into the rotor core in this state.

The conventional rotors having the above-described structures, however, have problems such as much eddy current loss caused by the cage portion of a die-cast material (e.g., zinc and aluminum), eddy current loss in a metal pipe, and difficulty in the maintenance of the high dimensional accuracy at the time of production due to the projection provided on the rotor core so as to prevent the movement of the magnetic materials.

In the rotor provided with air gaps for separating poles, when a breakage such as cracking is produced on the magnetic material (especially, ferrite) due to a thermal shock or a mechanical shock applied to the rotor, the fragments of the magnetic material flow into the air gaps, which sometimes leads to a further breakage or chipping.

In some rotors, an eddy current is produced by the secondary conductor in the rotor core, and since part of the magnetic flux produced from the magnetic material is short-circuited in the rotor core (conductor), the operation efficiency of the motor is lowered.

Other rotors suffer from problems such as the loosening of the rotor core and difficulty in the maintenance of the high dimensional accuracy due to the low accuracy of assembly in the process of press-fitting the rotary shaft of the motor.

SUMMARY OF THE INVENTION

Accordingly, it is an object of the present invention to eliminate the above-described problems in the related art and to provide a rotor of an electric motor for a compressor which can prevent the generation of an eddy current due to a metal protective pipe, the generation of an eddy current in a secondary conductor constituted by a die-cast material, the progress of the breakage of the magnetic material due to air gaps and the lowering of the dimensional accuracy of the rotor.

To achieve this aim, in a first aspect of the present invention, there is provided a rotor of an electric motor for a compressor having a compressing element and an electric motor for driving the compressing element which are accommodated in a single closed container, the rotor comprising: a rotor core composed of a plurality of laminated iron plates; a first end surface member formed from a non-magnetic material which has at least a balance weight and a caulking boss for caulking a disk for oil separation and which is disposed at one end of the rotor; a second end surface member formed from a nonmagnetic material which is disposed at the other end of the rotor; and a plurality of caulking members which penetrate the rotor core, the first end surface member and the second end surface member so as to integrally caulk the rotor core, the first end surface member and the second end surface member.

The rotor core is composed of a plurality of electromagnetic steel plates each having a thickness of not more than 0.5 mm which are integrally laminated by welding or caulking. The first end surface member/and or the second end surface member is composed of a die-cast nonmagnetic metal material, a drawn nonmagnetic metal drawing, or a resin material.

In a second aspect Of the present invention, there is provided a rotor of an electric motor for a compressor having a compressing element and an electric motor for driving the compressing element which are accommodated in a single closed container, the rotor comprising: a rotor core composed of a plurality of laminated iron plates which accommodate a plurality of magnetic materials constituting magnetic poles along the outer periphery of the rotor core; a first end surface member formed from a nonmagnetic material which has at least a balance weight and a caulking boss for caulking a disk for oil separation and which is disposed at one end of the rotor; a second end surface member formed from a nonmagnetic material which is disposed at the other end of the rotor; and a plurality of caulking members which are inserted into the respective through holes formed in the first end surface member and leading to the second end surface member through the rotor core so as to integrally caulk the rotor core, the first end surface member and the second end surface member.

The rotor core is provided with air gaps between the respective adjacent magnetic poles so as to prevent the short circuit of a magnetic flux. The air gaps lead to the respective through holes in which the caulking members are inserted. The magnetic material is, for example, a magnet of sintered ferrite, a sintered rare earth element, a rare earth element alloy or a plastic containing a rare earth element.

In a third aspect of the present invention, there is provided a rotor of an electric motor for a compressor having a compressing element and an electric motor for driving the compressing element which are accommodated in a single closed container, the rotor comprising: a rotor core composed of a plurality of laminated iron plates which accommodate a plurality of magnetic materials constituting magnetic poles along the outer periphery of the rotor core; a first end surface member formed from a nonmagnetic material which has at least a balance weight and a caulking boss for caulking a disk for oil separation and which is disposed at one end of the rotor; a second end surface member formed from a nonmagnetic material which is disposed at the other end of the rotor; and a welding portion for integrally welding the outer peripheral surfaces of the rotor core, the first end surface member and the second end surface member.

In a fourth aspect of the present invention, there is provided a rotor of an electric motor for a compressor having a compressing element and an electric motor for driving the compressing element which are accommodated in a single closed container, the rotor comprising: a rotor core composed of a plurality of laminated iron plates which accommodate a plurality of magnetic materials constituting magnetic poles along the outer periphery of the rotor core; a first end surface member formed from a nonmagnetic material which is disposed at one end of the rotor; a second end surface member formed from a nonmagnetic material which is disposed at the other end of the rotor; and a welding portion for integrally welding the outer peripheral surfaces of the rotor core, the first end surface member and the second end surface member.

In any of the rotors of an electric motor for a compressor having the above-described structures, since the rotor is integrally produced before the rotor is press-fitted into a rotary shaft, it is possible to maintain the high dimensional accuracy of the rotor.

In addition, since there is no secondary conductor constituted by a metal pipe or a die-cast material for protection, the generation of an eddy current is prevented.

The above and other objects, features and advantages of the present invention will become clear from the following description of the preferred embodiments thereof, taken in conjunction with the accompanying drawings.

DESCRIPTION OF THE PREFERRED EMBODIMENTS

Figure 1:
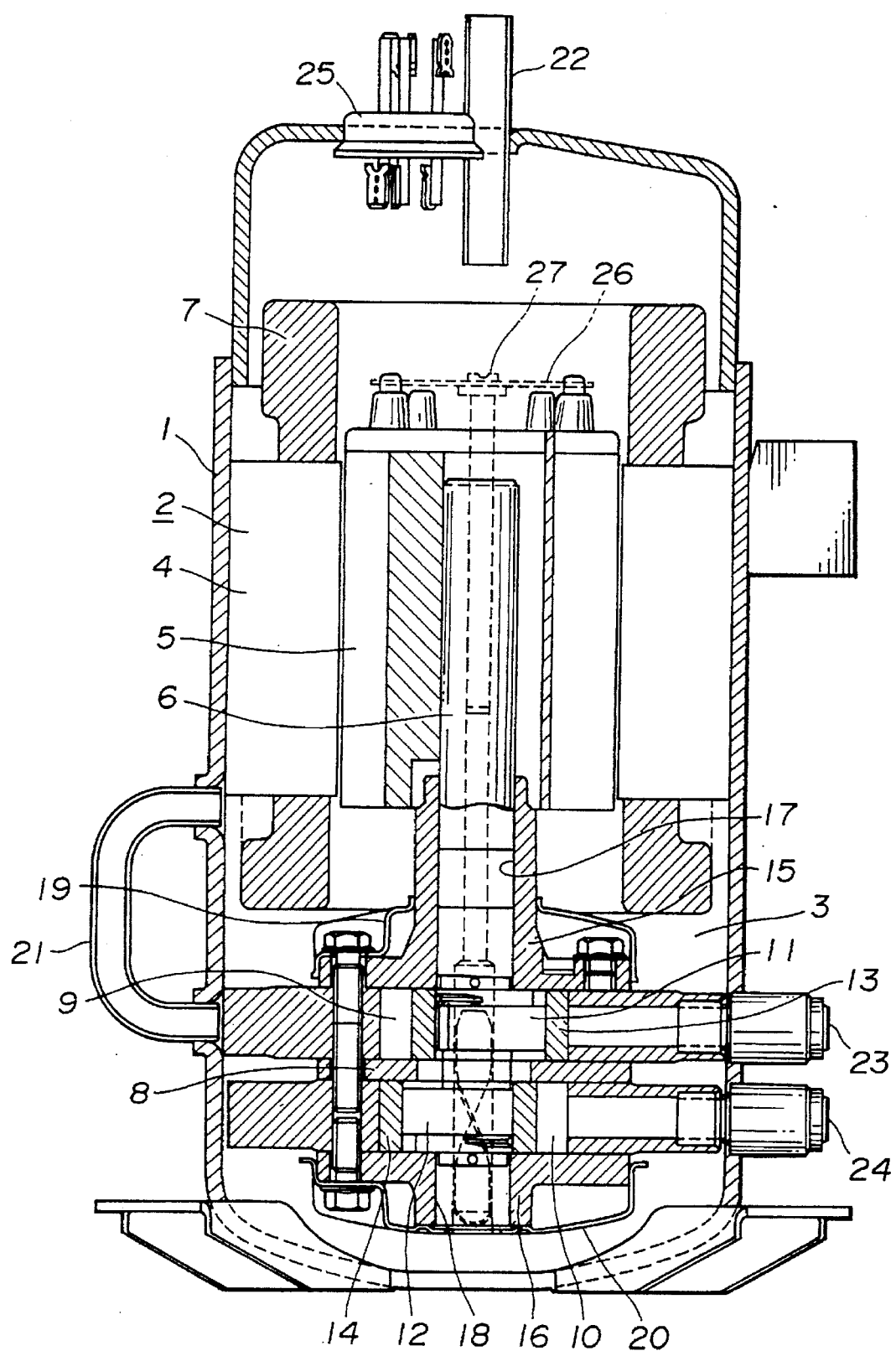
FIG. 1 is a sectional view of a compressor incorporating an embodiment of the rotor of an electric motor according to the present invention.

The present invention will be explained in more detail with reference to the following drawings. FIG. 1 is a sectional view of a rotary compressor. In FIG. 1, the reference numeral 1 represents a closed container accommodating an electric motor 2 in the upper part and a compressing element 3 driven by the electric motor 2 in the lower part. The closed container i is produced by bonding and closing the container accommodating the electric motor 2 and a container accommodating the compressing element by high-frequency welding or the like.

The electric motor 2 is composed of a stator 4 fixed to the inner wall of the closed container 1 and a rotor 5 supported by the inside of the stator 4 in such a manner as to be freely rotatable around a rotary shaft 6. The stator 4 is provided with a stator coil 7 for providing the rotor 5 with a rotating magnetic flux.

The compressing element 3 is provided with a first rotary cylinder 9 and a second rotary cylinder 10 which are separated from each other by a partition plate 8. Eccentric portions 11, 12 which are attached to the cylinders 9 and 10, respectively, are rotated around the rotary shaft 6 with a phase difference of 180 degrees therebetween.

The reference numerals 13 and 14 represent first and second rollers which rotate in the cylinders 9 and 10, respectively, with the rotations of the eccentric portions 11 and 12.

A first frame 15 and the partition plate 8 sandwich the cylinder 9 therebetween, and a second frame 16 and the partition plate 8 sandwich the cylinder 10 therebetween, thereby forming the respective compression spaces. The first frame 15 and the second frame 16 are provided with bearing portions 17 and 18, respectively, for supporting the rotary shaft 6.

Discharge mufflers 19, 20 are attached to the first frame 15 and the second frame 16, respectively, in such a manner as to cover the respective frames 15, 16. The cylinder 9 and the discharge muffler 19 communicate with each other through a discharge hole (not shown) formed in the first frame 15, and the cylinder 10 and the discharge muffler 20 communicate with each other through a discharge hole (not shown) formed in the second frame 16. A bypass pipe 21 provided on the outside of the closed container 1 communicates with the discharge muffler 20.

The reference numeral 22 denotes a discharge pipe provided at the top of the closed container 1, and 23, 24 suction pipes connected to the cylinders 9 and 10, respectively. A closing terminal 25 supplies electric power from an external equipment to the coil 7 of the stator 4. (Lead wires for connecting the stator coil 7 and the closing terminal 25 are not shown). The reference numeral 26 represents an oil separation disk which is fixed to the rotary shaft 6 by a bolt 27. The disk 26 may be fixed by a later-described boss.

Figure 2:
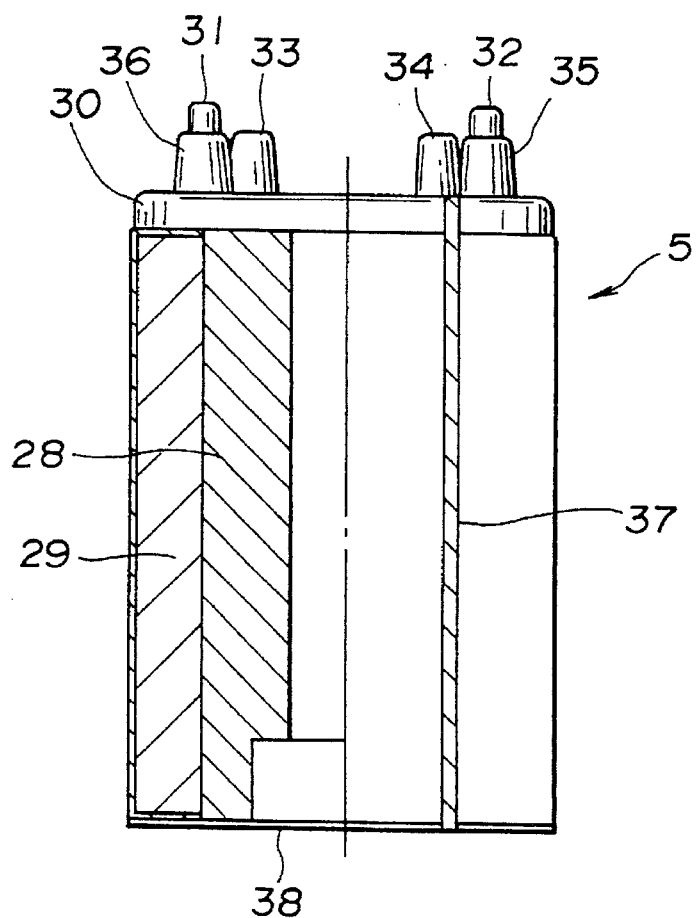
FIG. 2 is a partially sectional view of the embodiment shown in FIG. 1.

FIG. 2 is a partially sectional view of the rotor 5 shown in FIG. 1 before the rotary shaft 6 is press-fitted thereinto. A rotor core 28 is composed of a plurality of laminated electromagnetic steel plates (iron plates for a rotor) each having a thickness of 0.5 mm and punched into a predetermined shape. The electromagnetic steel plates are caulked with each other and integrally laminated (or integrally welded).

The reference numeral 29 denotes a magnetic material such as a magnet of sintered ferrite, a sintered rare earth element, an alloy of rare earth element and iron, or a plastic containing a rare earth element. As examples of the rare earth element praseodymium and neodymium will be cited. The magnetic material 29 is press-fitted or inserted into a slot which is formed in the rotor core 28 in the axial direction. A plurality of magnetic materials 29 are disposed in the rotor core 28 along the outer periphery of the rotor core 28.

A first end surface member 30 which is attached to one end of the rotor core 28 has balance weights 33, 34, 35 and 36 for counterbalancing the compressing element 3, and bosses 31, 32 disposed on the balance weights 36 and 35, respectively. The first end surface member 30, the balance weights 33 to 36 and the bosses 31 and 32 are integrally formed from a nonmagnetic material such as aluminum and zinc by die-casting or drawing or from a synthetic resin material.

The positions and the shapes of the bosses 31, 32 are determined in correspondence with the oil separation disk 26.

A second end surface member 38 which is attached to the other end of the rotor core 28 is integrally formed into an annular shape from a nonmagnetic material such as aluminum by die-casting or drawing or from a synthetic resin material in the same way as in the first end surface member 30.

A plurality of welding portions 37 are provided on the outer periphery of the rotor 5 in the axial direction. After the magnetic materials 29 are press-fitted into the rotor core 28 and the first end surface member 30 and the second end surface member 38 are set, these welding portions 37 are simultaneously welded so as to produce the rotor 5.

Figure 3:
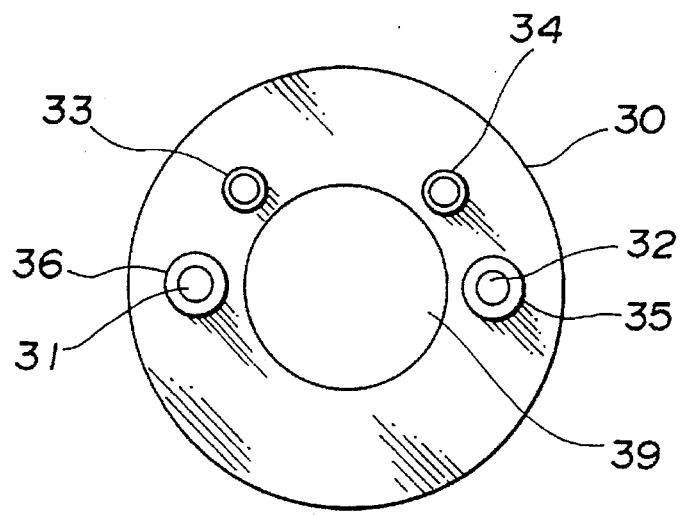
FIG. 3 is a plan view of the first end surface member shown in FIG. 2.

FIG. 3 is a plan view of the first end surface member 30 shown in FIG. 2. The end surface member 30 has a concentric (annular) shape, and the rotary shaft 6 of the rotor 5 is passed through a shaft hole 39.

Figure 4:
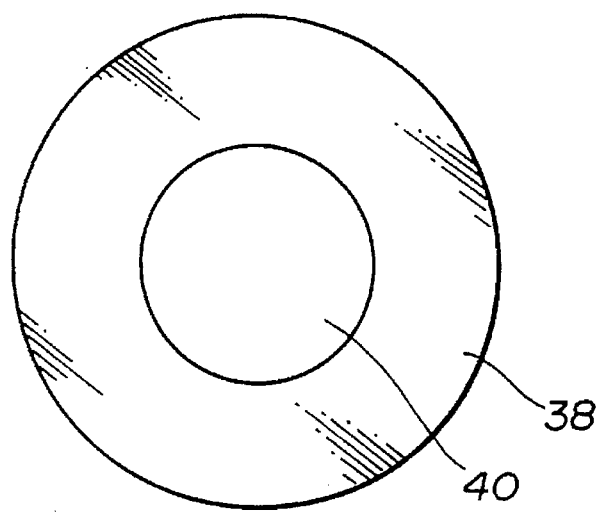
FIG. 4 is a plan view of the second end surface member shown in FIG. 2.

FIG. 4 is a plan view of the second end surface member 38 shown in FIG. 2. The end surface member 38 has a concentric (annular) shape, and the rotary shaft 6 of the rotor 5 is passed through a shaft hole 40.

Figure 5:
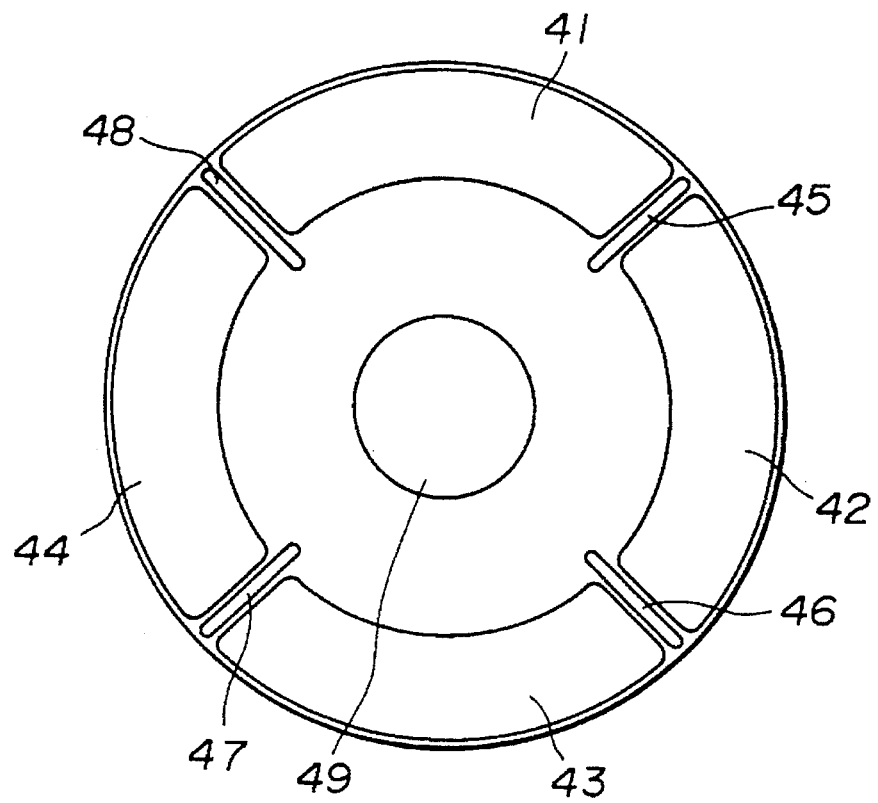
FIG. 5 is a plan view of the electromagnetic steel plates (iron plates for the rotor) used for the rotor core shown in FIG. 2.

FIG. 5 is a plan view of the electromagnetic steel plates (iron plates for the rotor) used for the rotor core 28 shown in FIG. 2. In FIG. 5, the reference numerals 41 to 44 denote slots into which the magnetic materials 29, having a shape obtained by removing a small sector from a concentric large sector (this section will be hereinunder referred to as "a fan-shaped section"), are press-fitted. The slots 41 to 44 are formed in the rotor core 28 along the outer periphery. Slits 45 to 48 are provided between the respective adjacent slots 41 to 44 (on the boundaries between the poles). The slits 45 to 48 function as the air gaps for promoting the separation of the respective magnetic poles after the magnetic materials 29 are press-fitted into the slots 41 to 44.

Figure 6:
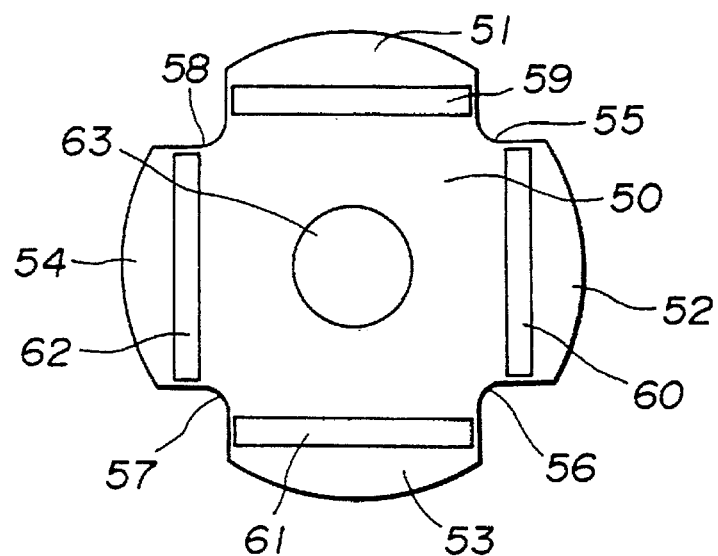
FIG. 6 is a plan view of a modification of the rotor core shown in FIG. 2.

FIG. 6 is a plan view of a modification of the rotor core 28 shown in FIG. 2. The rotor core shown in FIG. 6 is composed of a plurality of laminated electromagnetic steel plates 50 each punched into a shape for forming salient pole portions 51 to 54. The reference numerals 55 to 58 denote notched portions for forming the salient pole portions 51 to 54.

The reference numerals 59 to 62 denote slots into which the magnetic materials 29 are press-fitted, and 63 a shaft hole through which the rotary shaft 6 is passed.

After the magnetic materials 29 are press-fitted into the rotor core, the end surface members 30, 38 are set, and the outer periphery of the rotor 5 is welded so as to integrally form the rotor 5 in the same way as the rotor 5 shown in FIG. 2. In this example, each of the end surface members 30 and 38 may have the same shape as the respective end surfaces of the rotor core.

Figure 7:
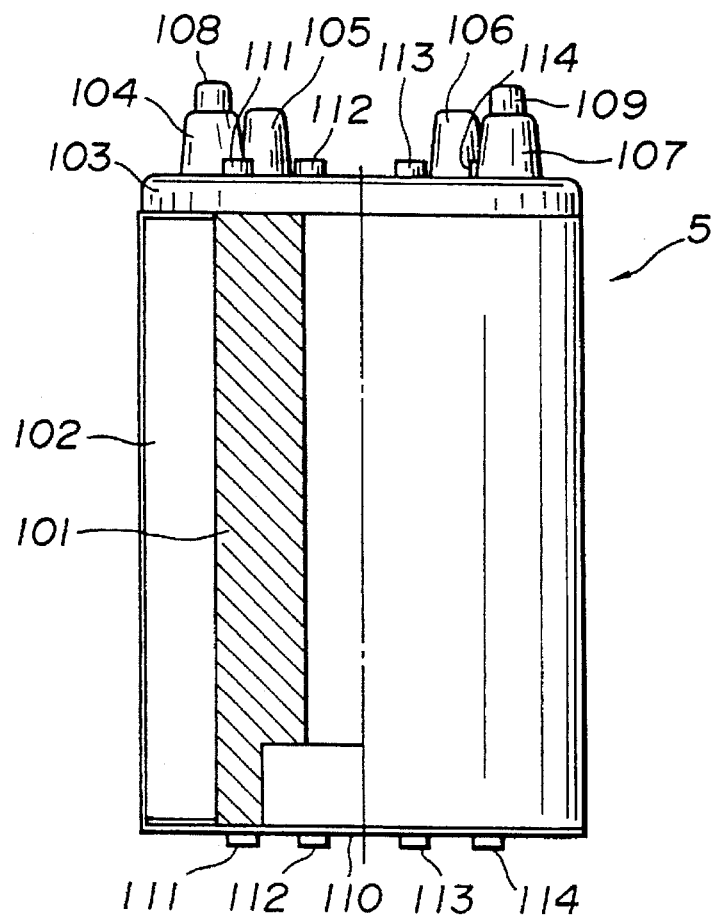
FIG. 7 is a partially sectional view of another embodiment of the rotor of an electric motor for a compressor according to the present invention.

FIG. 7 is a partially, sectional view of another embodiment of the rotor of an electric motor for a compressor according to the present invention. In FIG. 7, the reference numeral 101 denotes a rotor core which is composed of a plurality of laminated electromagnetic steel plates (iron plates for a rotor) each having a thickness of 0.5 mm and punched into a predetermined shape. The electromagnetic steel plates are caulked with each other and integrally laminated (or integrally welded).

The reference numeral 102 denotes a magnetic material (the same as the magnetic material shown in FIG. 2). The magnetic material 102 is press-fitted or inserted into a slot which is formed in the rotor core 28 in the axial direction. A plurality of magnetic materials 102 are disposed in the rotor core 101 along the outer periphery of the rotor core 101.

A first end surface member 103 which is attached to one end of the rotor core 101 has balance weights 104, 105, 106 and 107 for counterbalancing the compressing element 3, and bosses 108, 109 disposed on the balance weights 104 and 107, respectively. The first end surface member 103, the balance weights 104 to 107 and the bosses 108 and 109 are integrally formed from a nonmagnetic material such as aluminum and zinc by die-casting or drawing or from a synthetic resin material.

The positions and the shapes of the bosses 108, 109 are determined in correspondence with the oil separation disk 26.

A second end surface member 110 which is attached to the other end of the rotor core 101 is integrally formed into an annular shape from a nonmagnetic material such as aluminum by die-casting or drawing or from a synthetic resin material in the same way as in the first end surface member 103.

Caulking members (caulking pins, caulking bolts or the like) 111 to 114 integrally caulk the first end surface member 103, the rotor core 101 and the second end surface member 110 by utilizing the through holes formed in the first end surface member 103, the rotor core 101 and the second end surface member 110.

Figure 8:
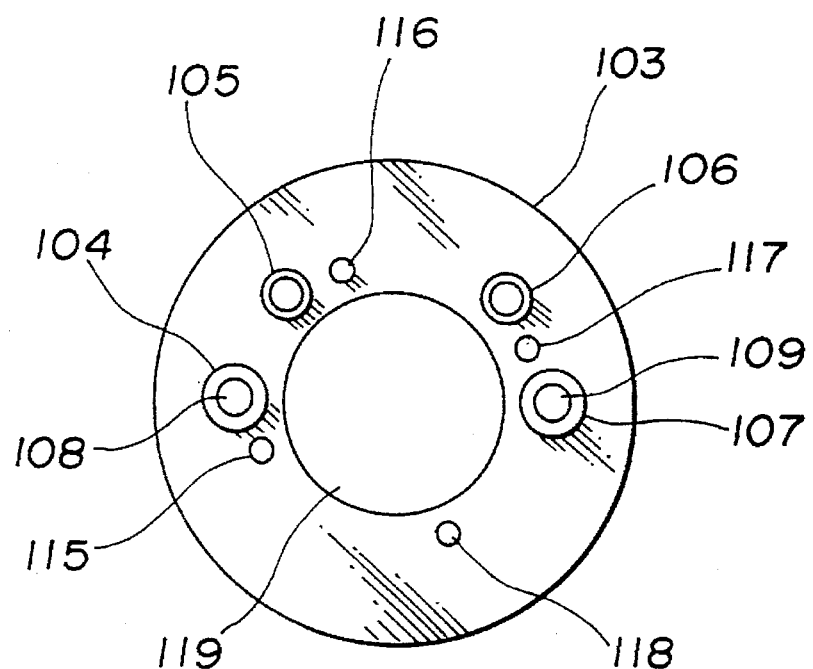
FIG. 8 is a plan view of the first end surface member shown in FIG. 7.

FIG. 8 is a plan view of the first end surface member 103 shown in FIG. 7. The end surface member 103 has a concentric (annular) shape, and the rotary shaft 6 of the rotor 5 is passed through a shaft hole 119.

The reference numerals 115 to 118 represent through holes through which the caulking members 111 to 114, respectively, are passed. Each of the through holes 115 to 118 has appropriate size and shape corresponding to the respective caulking members 111 to 114.

Figure 9:
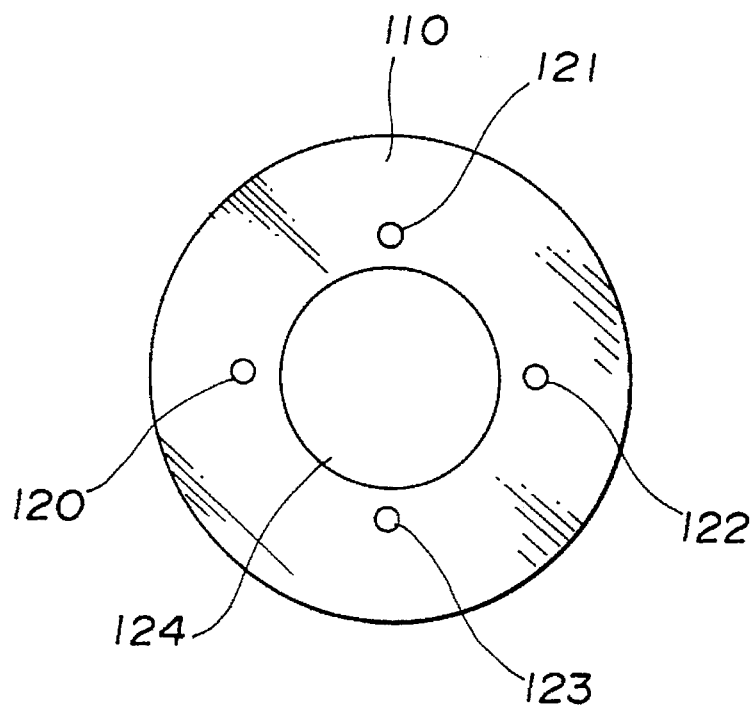
FIG. 9 is a plan view of the second end surface member shown in FIG. 7.

FIG. 9 is a plan view of the second end surface member 110 shown in FIG. 7. The end surface member 110 has a concentric (annular) shape, and the rotary shaft 6 of the rotor 5 is passed through a shaft hole 124.

The reference numerals 120 to 123 represent through holes through which the caulking members 111 to 114, respectively, are passed. Each of the through holes 120 to 123 has appropriate size and shape corresponding to the respective caulking members 111 to 114.

Figure 10:
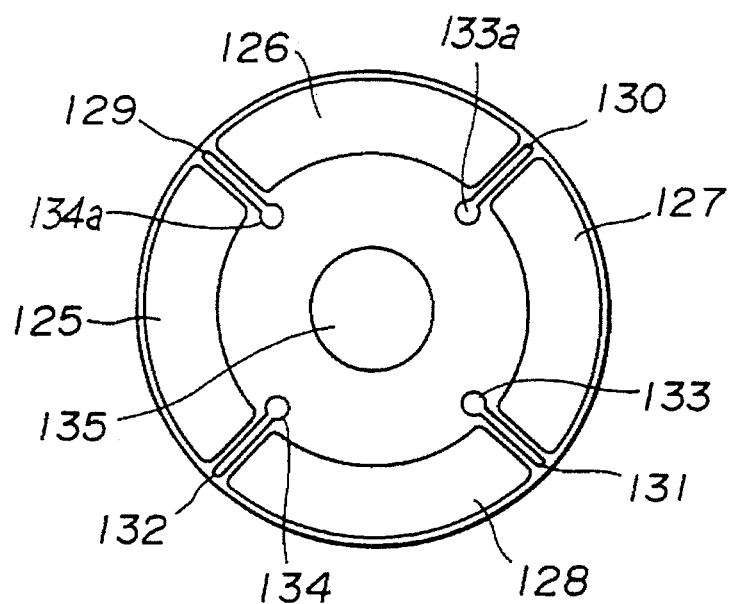
FIG. 10 is a plan view of the electromagnetic steel plates (iron plates for the rotor) used for the rotor core shown in FIG. 7.

FIG. 10 is a plan view of the electromagnetic steel plates (iron plates for the rotor) used for the rotor core 101 shown in FIG. 7. In FIG. 10, the reference numerals 125 to 128 denote slots into which the magnetic materials 102 having a fan-shaped section are press-fitted. The slots 125 to 128 are formed in the rotor core 101 along the outer periphery. Slits 129 to 132 are provided between the respective adjacent slots 125 to 128 (on the boundaries between the poles). The slits 129 to 132 function as air gaps for promoting the separation of the respective magnetic poles after the magnetic materials 102 are press-fitted into the slots 125 to 128.

The reference numerals 133, 133a, 134, 134a represent through holes through which the caulking members 111 to 114, respectively, are passed. Each of the through holes 120 to 123 has appropriate size and shape corresponding to the respective caulking members 111 to 114. They are disposed between the respective adjacent slots 125 to 128 so as to communicate with the respective slits 129 to 132. Since the slits 129 to 132 communicate with the through holes 133, 133a, 134, 134a the air gaps between the adjacent magnetic poles are so enlarged as to reduce the flux leakage and the operation efficiency of the electric motor is enhanced to that degree. The reference numeral 135 represents a shaft hole into which the rotary shaft 6 is press-fitted.

After the first end surface member 103, the rotor core 101 and the second end surface member 110 are laid with one on top of another in such a manner that the through holes 115 to 118, 133, 133a, 134, 134a and 120 to 123 communicate with each other, they are integrally caulked by the caulking members 111 to 114 so as to produce the rotor 5.

Figure 11:
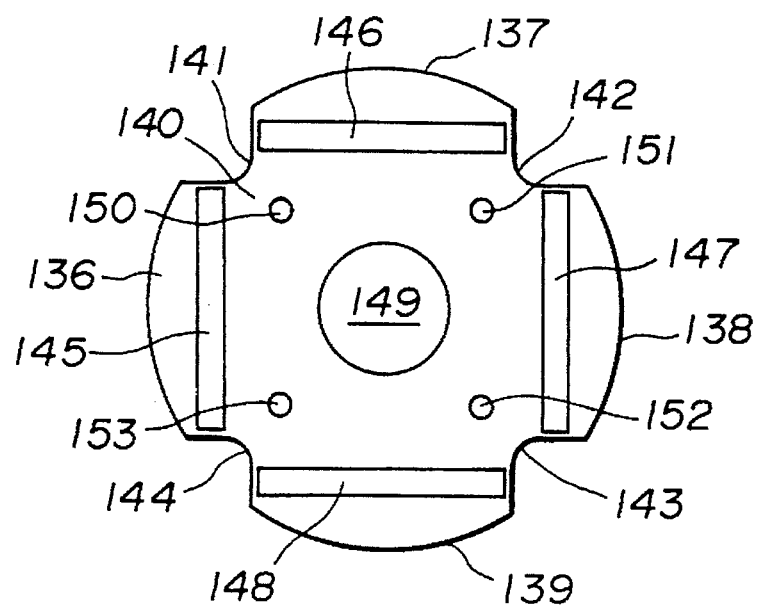
FIG. 11 is a plan view of a modification of the rotor core shown in FIG. 7.

FIG. 11 is a plan view of a modification of the rotor core 101 shown in FIG. 7. The rotor core shown in FIG. 11 is composed of a plurality of laminated electromagnetic steel plates 140 each punched into a shape for forming salient pole portions 136 to 139. The reference numerals 141 to 144 denote notched portions for forming the salient pole portions 136 to 139.

The reference numerals 145 to 148 denote slots into which the magnetic materials 102 are press-fitted and 149 a shaft hole through which the rotary shaft 6 is passed.

The reference numerals 150 to 153 represent through holes through which the caulking members 111 to 114, respectively, are passed. Each of the through holes 150 to 153 has appropriate size and shape corresponding to the respective caulking members 111 to 114. After the magnetic materials 102 are press-fitted into the rotor core, the end surface members are set, and the rotor 5 is integrally produced by using the caulking members 111 to 114, in the same way as the rotor 5 shown in FIG. 7. In this example, each of the end surface members may have the same shape as the respective end surfaces of the rotor cores.

Figure 12:
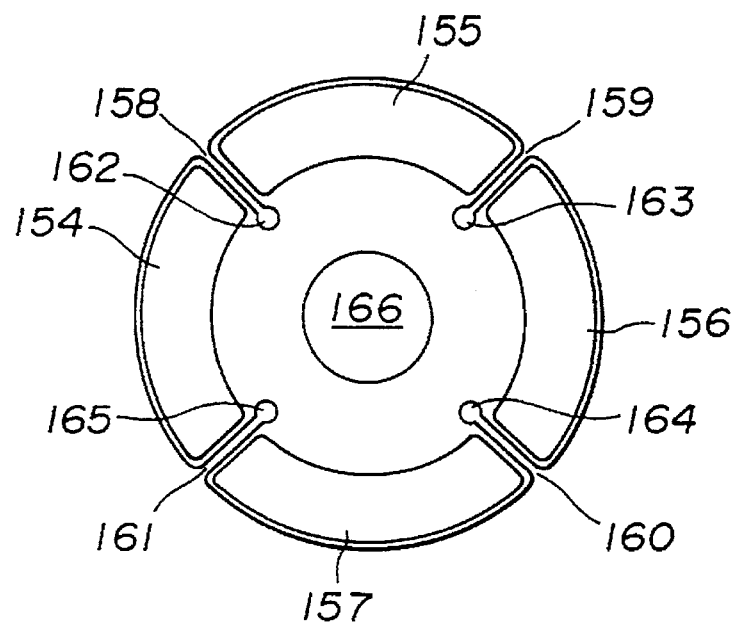
FIG. 12 is a plan view of another modification of a rotor core shown in FIG. 7.

FIG. 12 is a plan view of another modification of the rotor core 101 shown in FIG. 7. In FIG. 12, the reference numerals 154 to 157 denote slots into which the magnetic materials 102 having a fan-shaped section are press-fitted and 158 to 161 slits provided between the respective adjacent slots 154 to 157 (on the boundaries between the poles). The slits 158 to 161 function as air gaps for promoting the separation of the respective magnetic poles after the magnetic materials 102 are press-fitted into the slots 154 to 157.

The reference numerals 162 to 165 represent through holes through which the caulking members 111 to 114, respectively, are passed. Each of the through holes 162 to 165 has appropriate size and shape corresponding to the respective caulking members 111 to 114. They are disposed between the respective adjacent slots 154 to 157 so as to communicate with the respective slits 158 to 161. These continuous holes and slits open on the outer periphery of the rotor core.

Since the slits 158 to 161 communicate with the through holes 162 to 165 and these continuous holes open on the outer periphery of the rotor core, the air gaps between the adjacent magnetic poles are so enlarged as to reduce the flux leakage and the operation efficiency of the electric motor is enhanced to that degree. The reference numeral 166 represents a shaft hole into which the rotary shaft 6 is press-fitted.

As described above, in the embodiments shown in FIGS. 1 to 12, since there is no secondary conductor constituted by a metal pipe or a die-cast material which causes an eddy current, it is possible to enhance the operation efficiency of the electric motor to that degree. In other words, a smaller motor than a conventional one can have the same output. It is therefore possible to reduce the entire size of a compressor.

In addition, by providing air gaps between the respective adjacent magnetic poles of the rotor, it is possible to reduce the flux leakage and to further enhance the operation efficiency of the electric motor.

Figure 13:
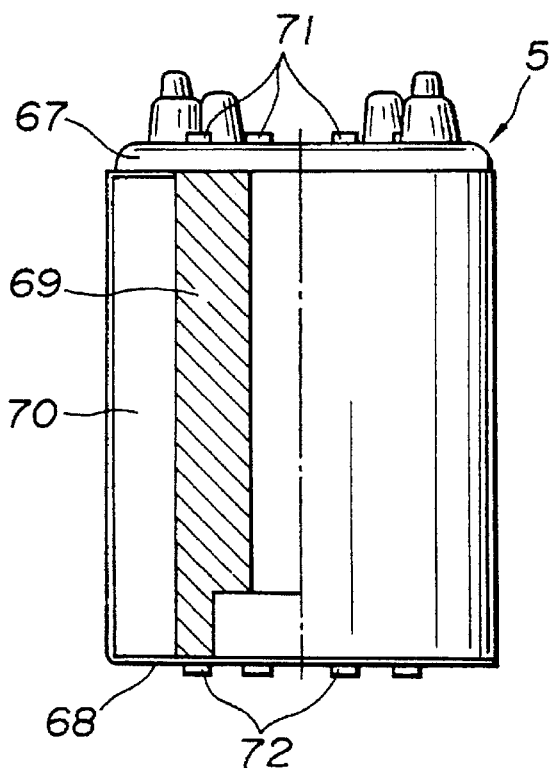
FIG. 13 is a partially sectional view of still another embodiment of the rotor of an electric motor for a compressor according to the present invention.
Figure 14:
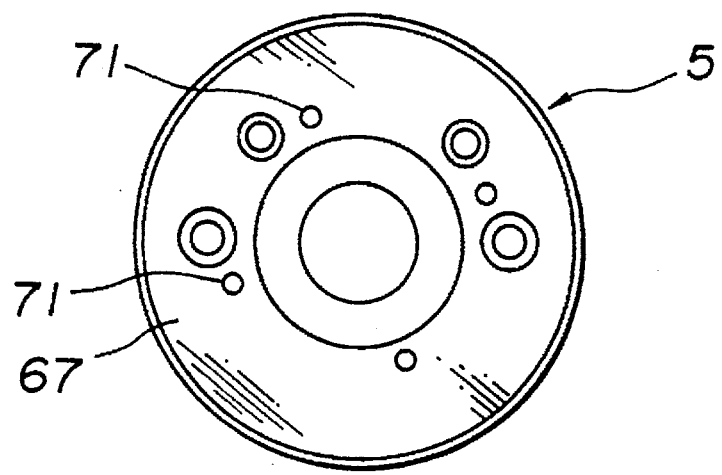
FIG. 14 is a plan view of the embodiment shown in FIG. 13.
Figure 15:
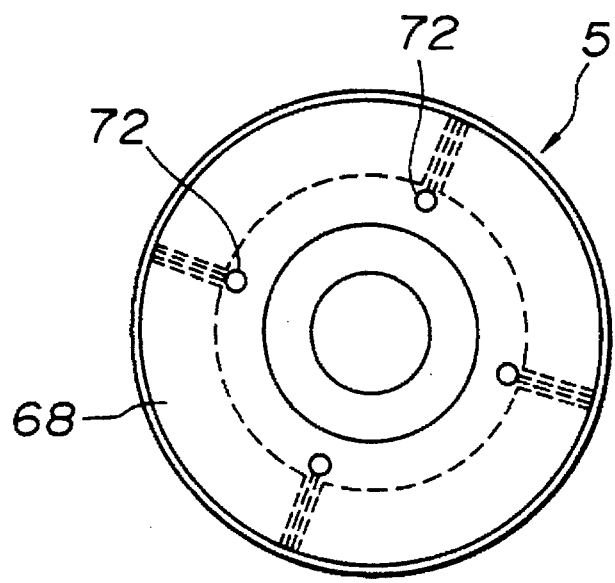
FIG. 15 is a bottom view of the embodiment shown in FIG. 13.
Figure 16:
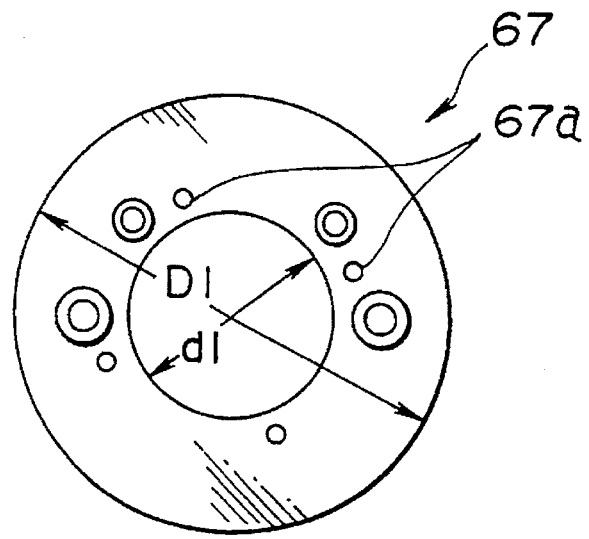
FIG. 16 is a plan view of the first end surface member shown in FIG. 13.
Figure 17:
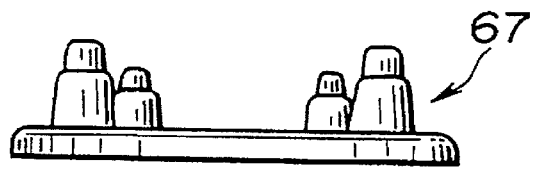
FIG. 17 is a side elevational view of the first end surface member Shown in FIG. 13.
Figure 18:
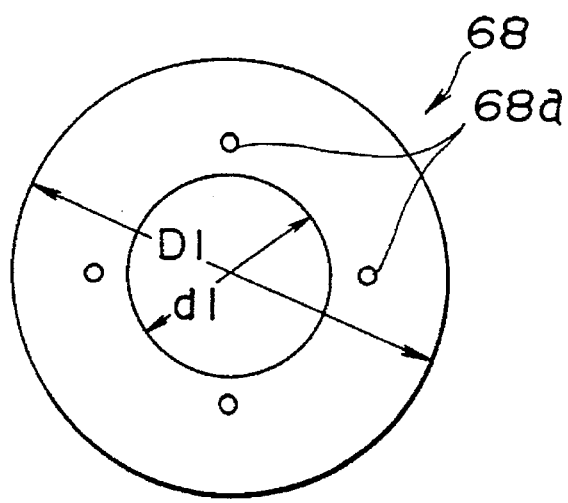
FIG. 18 is a plan view of the second end surface member shown in FIG. 13.
Figure 19:
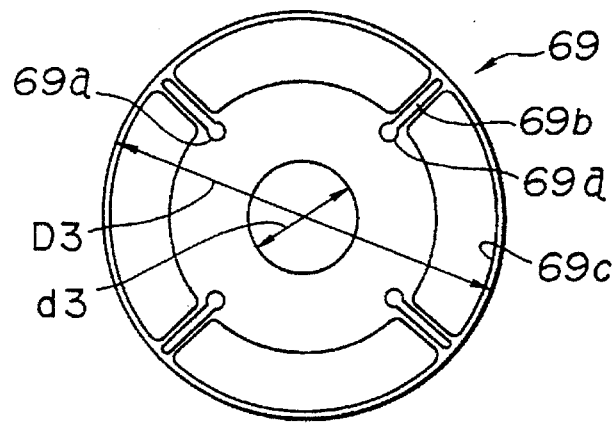
FIG. 19 is a plan view of the rotor core shown in FIG. 13.

FIG. 13 is a partially sectional view of still another embodiment of the rotor 5 of an electric motor for a compressor according to the present invention, FIG. 14 is a plan view thereof and FIG. 15 is a bottom view thereof. FIG. 16 is a plan view of the first end surface member of the rotor, FIG. 17 is a side elevational view thereof, FIG. 18 is a plan view of the second end surface member of the rotor and FIG. 19 is a plan view of the rotor core shown in FIG. 13. In these drawings, the reference numeral 69 represents a rotor core and 70 a magnetic material composed of a permanent magnet and inserted into the rotor core 69. A first end surface member 67 and a second end surface member 68 formed from a nonmagnetic material similar to that in the above-described embodiments are disposed on the top and the bottom of the rotor core 67 and the magnetic materials 70. These elements are bolted by a plurality of (four in this embodiment) bolts 71 and nuts 72, and the rotary shaft 6 of the electric motor 2 is press-fitted thereinto.

In this case, the inner diameter d1 of each of the first and second end surface members 67, 68 is larger than the inner diameter d3 of the rotor core 69 shown in FIG. 19, and the outer diameter D1 of each of the first and second end surface members 67, 68 is smaller than the outer diameter D3 of the rotor core 69. The diameter of each of the bolt holes 67a and 68a formed in the first and second end surface members 67 and 68, respectively, is larger than the diameter of each of the bolt hole 69a of the rotor core 69 shown in FIG. 19.

In FIG. 19, the rotor core 69 has four slits 69b and and four slots 69c having a fan-shaped section into which magnetic materials 70 having a fan-shaped section are press-fitted.

Figure 20:
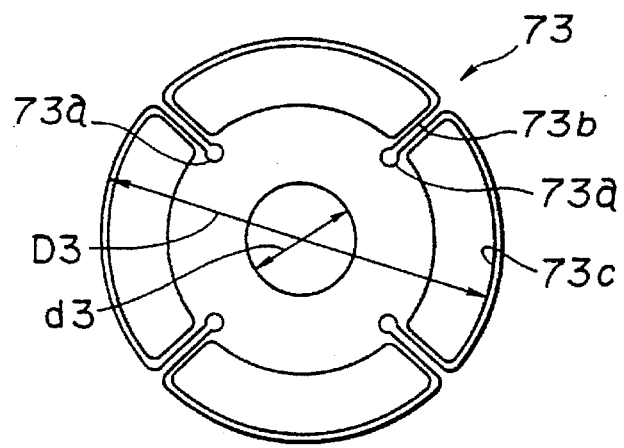
FIG. 20 is a plan view of a modification of the rotor core shown in FIG. 13.

FIG. 20 shows a modification of the rotor core 69 shown in FIG. 13. In a rotor core 73 shown in FIG. 20, bolt holes 73a communicate with slits 73b and these continuous holes open on the outer periphery of the rotor core 73. The reference numeral 73c denotes a through hole for inserting the magnetic material 70 thereinto.

Figure 21:
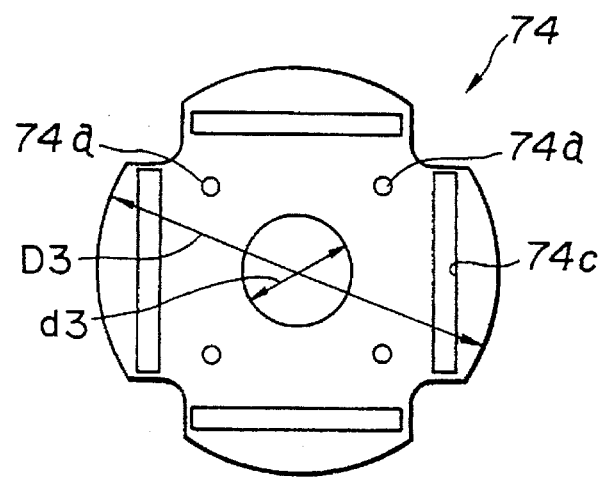
FIG. 21 is a plan view of another modification of the rotor core shown in FIG. 13.

FIG. 21 shows another modification of the rotor core 69 shown in FIG. 13. A rotor core 74 shown in FIG. 21 has bolt holes 74a and slots 74c for inserting the plate-like magnetic materials 70 thereinto.

According to the embodiment shown in FIGS. 13 to 21, the machining tolerance in each of the outer and inner diameters of the first and second end surface members 67, 68 and the bolt holes may not be very strict. It is also easy to align the inner peripheries, the outer peripheries and the bolt holes of the first and second end surface members and the rotor core at the time of bolting (or caulking) these three elements.

Figure 22:
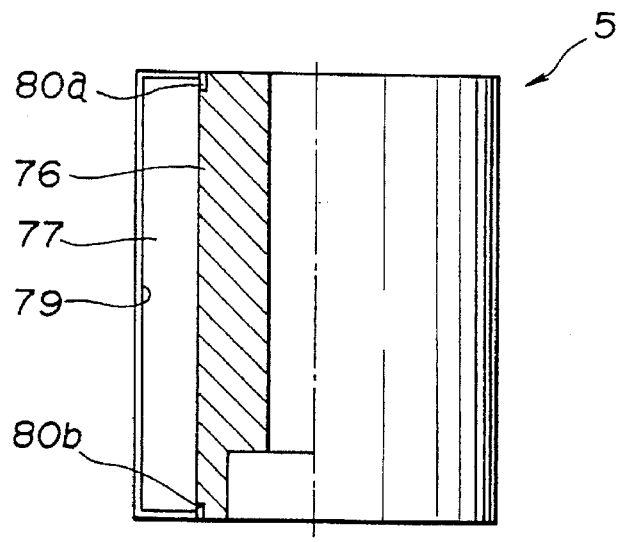
FIG. 22 is a partially sectional view of a further embodiment of the rotor of an electric motor for a compressor according to the present invention.
Figure 23:
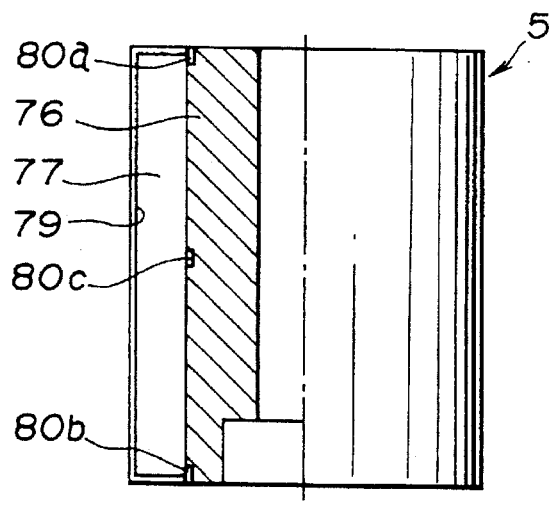
FIG. 23 is a partially sectional view of a modification of the rotor core shown in FIG. 22.
Figure 24:
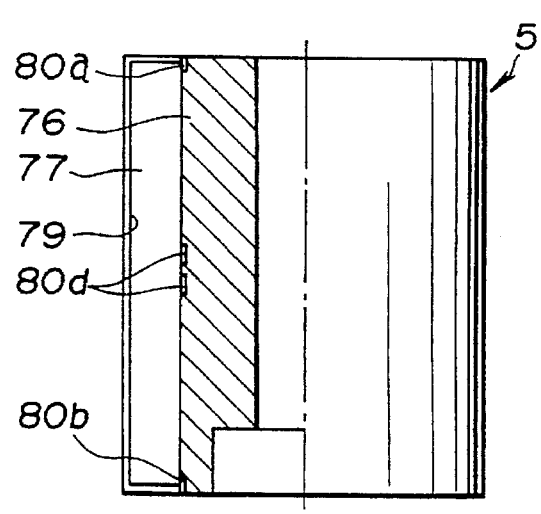
FIG. 24 is a partially sectional view of another modification of the rotor core shown in FIG. 22.

FIG. 22 is a partially sectional view of a further embodiment of the rotor of an electric motor for a compressor according to the present invention. In this embodiment, the rotor is provided with grooves having a U-shaped section in the walls of the slots of the rotor core perpendicularly relative to the axial direction of the slots. Grooves 80a and 80b having a U-shaped section are provided at the upper end and the lower end of each slot 79 of a rotor core 76. The reference numeral 77 denotes a magnetic material (permanent magnet) press-fitted into each slot 79. In the modification of the rotor core 76 shown in FIG. 23, one groove 80c is added at the central portion of each slot 79, and in the modification of the rotor core 76 shown in FIG. 24, two grooves 80d are added at the central portion of each slot 79.

In any of these rotor cores 76, when the magnetic materials 77 are press-fitted into the slots 79, the rotor core 76 which receives the pressure deforms so as to release the pressure, thereby reducing the resistance to press-fit.

Figure 25:
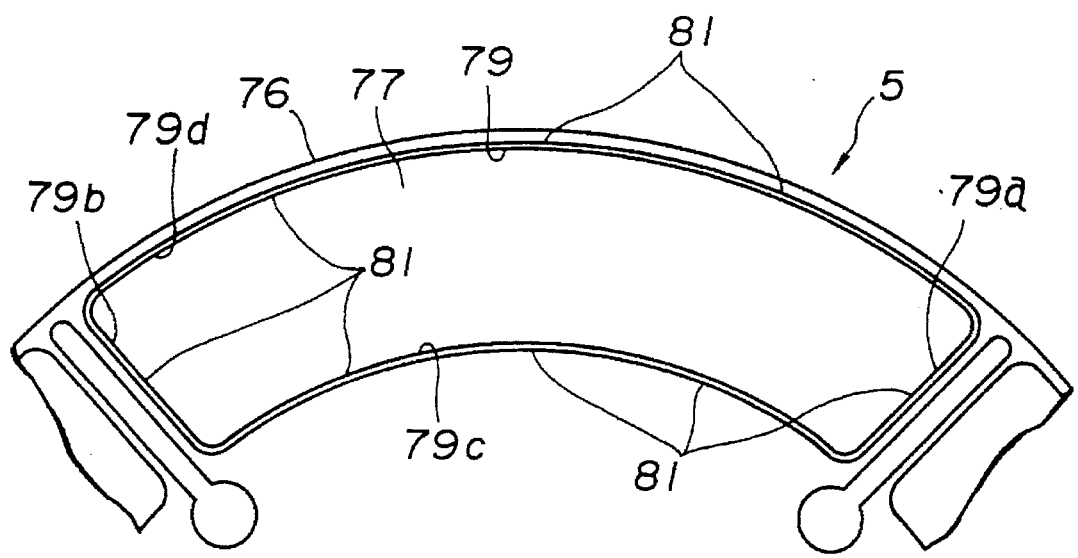
FIG. 25 is a partially enlarged plan view of still another modification of the rotor core shown in FIG. 22.

FIG. 25 is a partially enlarged plan view of still another modification of the rotor core 76 shown in FIG. 22. The rotor core shown in FIG. 25 is provided in the axial direction of the slots 79 with grooves having a V-shaped section on each of the inner walls of the slots 79.

One groove 81 having a V-shaped section is provided in each opposing side inner walls 79a, 79b and three grooves 81 are provided in opposing peripheral inner walls 79c, 79d in each slot 79.

When the magnetic materials 77 are press-fitted into the slots 79, the grooves 81 deform so as to elastically hold the magnetic materials 77.

Figure 26:
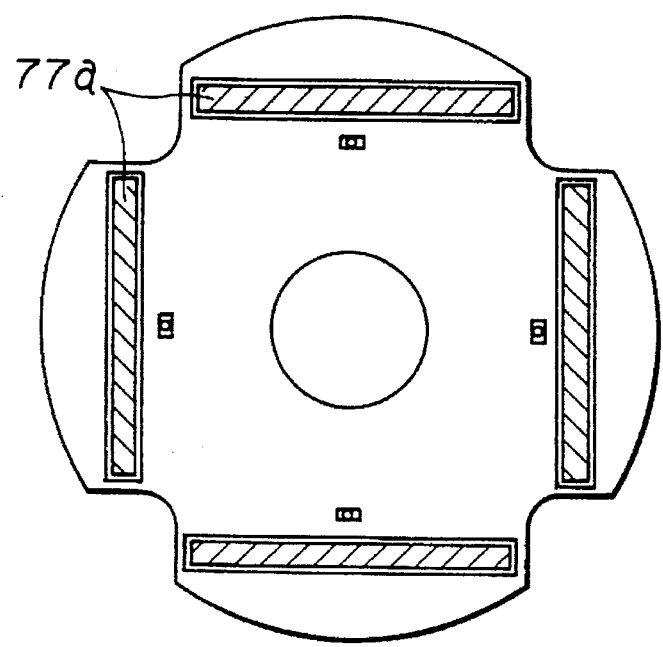
FIG. 26 is a plan view of a further modification of the rotor core shown in FIG. 22.

Such grooves can also be provided in the rotor core shown in FIG. 26, in which magnetic material 77a has a plate-like shape.

According to the embodiment shown in FIGS. 22 to 26, even if a magnet of a sintered material such as ferrite is used as the magnetic material, since no additional machining is necessary, it is possible to allow a large press-fit margin and the engagement between the magnetic material and the slot is firm, so that it is possible to simplify the production steps, which leads to a large reduction in the cost.

Figure 27:
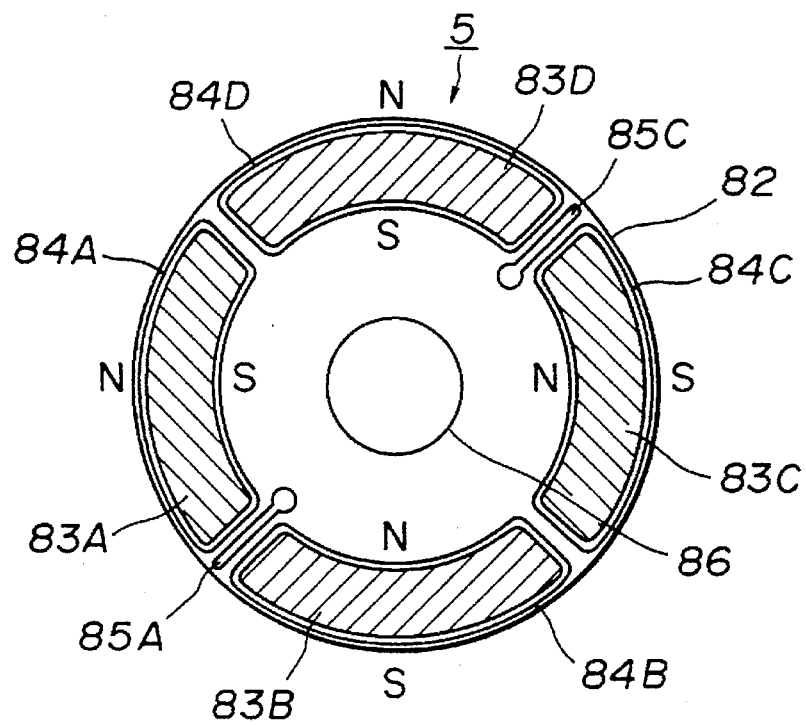
FIG. 27 is a plan view of a still further embodiment of the rotor of an electric motor for a compressor according to the present invention.

FIG. 27 is a plan view of an iron plate constituting a still further embodiment of the rotor of an electric motor for a compressor according to the present invention. An iron plate 82 is provided with slots 84A to 84D having a fan-shaped section into which magnetic materials (permanent magnets) 83A to 83D are press-fitted. The slots 84A to 84D are formed in the iron plate 82 along the outer periphery. Since the rotor 5 is used for a quadripolar electric motor, the four magnetic materials are used. Slits 85A and 85C are provided between the magnetic materials 83A and 83B, and between the magnetic material 83C and 83D, respectively, so as to prevent the short circuit of the magnetic flux therebetween. The slits 85A and 85C insulate the magnetic flux (prevent short circuit) by utilizing the high insulation property of air with respect to magnetism.

As the magnetic materials 83A to 83D, magnets of sintered ferrite, a sintered rare earth element, an alloy of rare earth element and iron or a plastic containing a rare earth element are usable, as described above. The rotary shaft 6 is press-fitted into the rotor 5 through a shaft hole by Shrink fitting or the like. A caulking rod (not shown) is inserted into a circular portion at the proximal end of each of the slits 85A and 85C so as to integrally assemble and laminate a multiplicity of iron plates 82.

According to this structure, since the slits 85A and 85C are provided between the magnetic materials 83A and 83B, and between the magnetic material 83C and 83D, respectively, the short circuit of the magnetic flux is prevented, but since there is no air gap between the magnetic materials 83B and 83C, and between the magnetic material 83D and 83A, the magnetic flux is short circuited. That is, the rotor substantially functions as a rotor for a bipolar motor.

Figure 28:
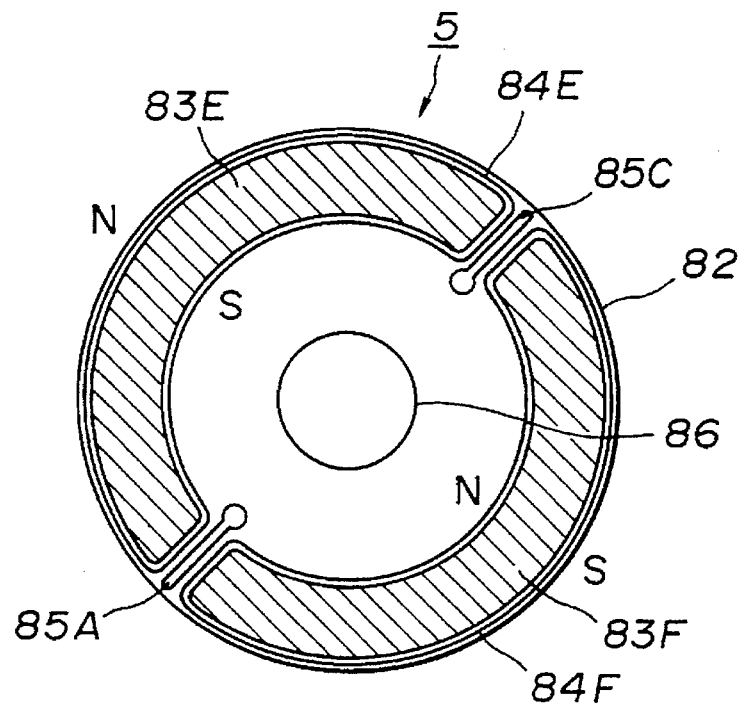
FIG. 28 is a plan view of a modification of the iron plate shown in FIG. 27.

FIG. 28 is a plan view of a modification of the iron plate 82 shown in FIG. 27. In this case, slots 84E and 84F having a fan-shaped section and extending over the semicircle are provided in the iron plate 82, and two magnetic materials 83E and 84F are press-fitted into the slots 84E and 84F, thereby producing the rotor for a bipolar electric motor.

Figure 29:
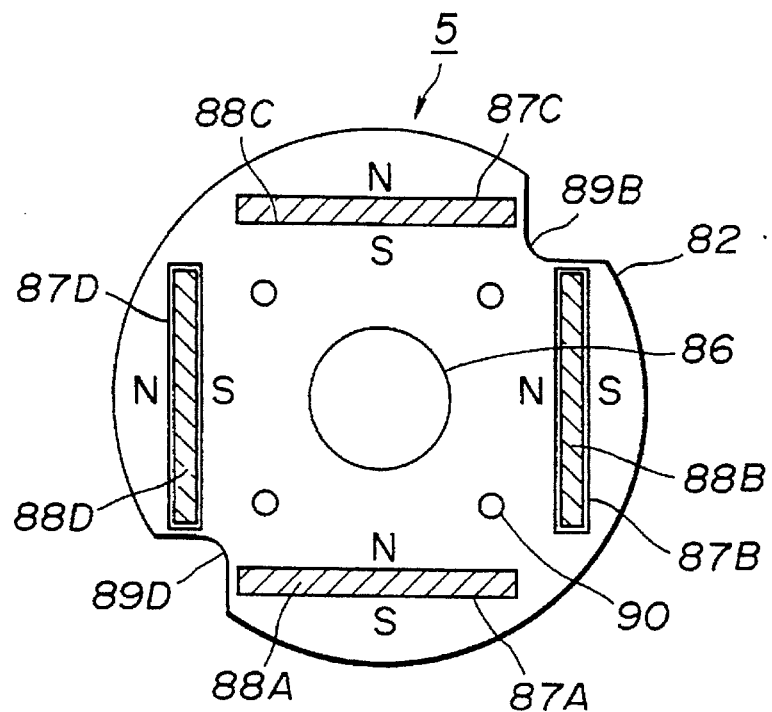
FIG. 29 is a plan view of another modification of the iron plate shown in FIG. 27.

FIG. 29 is a plan view of another modification of the iron plate 82 shown in FIG. 27. In this case, linear slots 87A to 87D are provided in the iron plate 82, and plate-like magnetic materials 88A to 88D are press-fitted into the respective slots 87A to 87D. Since the rotor 5 is used for a quadripolar electric motor, the four magnetic materials are used. Two notched portions 89D and 89B are provided along the outer periphery so as to prevent the short circuit between the magnetic materials 88A and 88D, and between the magnetic materials 88B and 88C.

These notched portions 89D and 89B increase the distance between the corresponding magnetic materials, and by utilizing the high insulating quality of air, the short circuit of the magnetic flux is prevented (insulated). The reference numeral 90 denotes a hole into which a caulking rod (not shown) for integrally assembling and laminating a multiplicity of iron plates 82 is inserted.

According to this structure, the short circuit of the magnetic flux is prevented between the magnetic materials 88A and 88D and between the magnetic materials 88B and 88C by the notched portions 89D and 88D, respectively, but since there is no notched portion between the magnetic materials 88A and 88B and between the magnetic materials 88C and 88D, the magnetic flux is short circuited. That is, the rotor substantially functions as a rotor for a bipolar motor.

Figure 30:
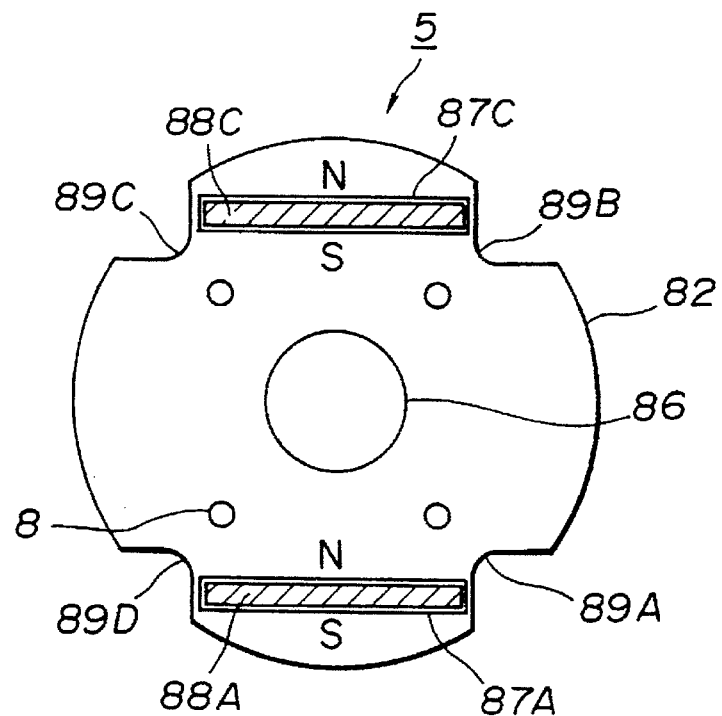
FIG. 30 is a plan view of Still another modification of the iron plate shown in FIG. 27.

FIG. 30 is a plan view of still another modification of the iron plate 82 shown in FIG. 27. In this case, four notched portions 89A to 89D are provided, while only two magnetic materials 88A and 88C are provided. Since there are only two magnetic materials 88A and 88C, the notched portions 89A to 89D exert no influence on the magnetic flux. That is, the rotor is for a bipolar motor.

In the embodiment shown in FIGS. 27 to 30, a method of converting a quadripolar motor structure to a bipolar motor structure is described. It goes without saying that this embodiment is applicable to the case of reducing, for example, the eight poles of a motor to four poles.

In other words, a comparatively simple structure of providing a means for preventing the short circuit of the magnetic flux between one pair of magnetic poles and not providing the means at the other ends of the respective poles can easily reduce the number of poles of an electric motor.

As a result, for example, it is possible to reduce the chopping frequency of the electric power which is supplied to the stator coil to ½ by changing a bipolar motor to a quadripolar motor. Therefore, a chopper transistor used in an inverter circuit need not be an expensive transistor having a high switching response characteristic. In addition, since the loss in a switching circuit is reduced, the enhancement of the inversion efficiency of an inverter and the motor efficiency is achieved.

Figure 31:
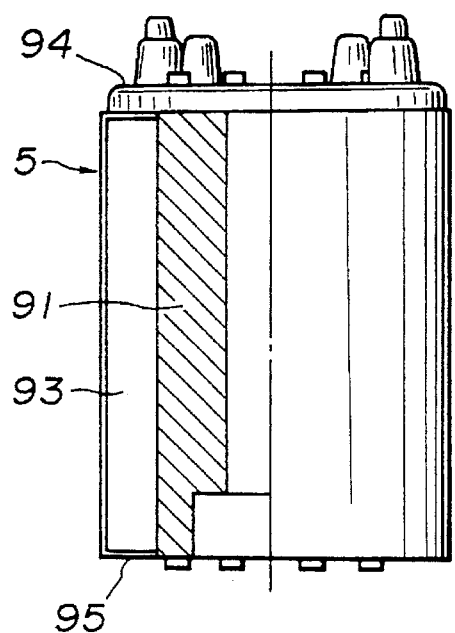
FIG. 31 is a partially sectional view of a still further embodiment of the rotor of an electric motor for a compressor according to the present invention.
Figure 32:
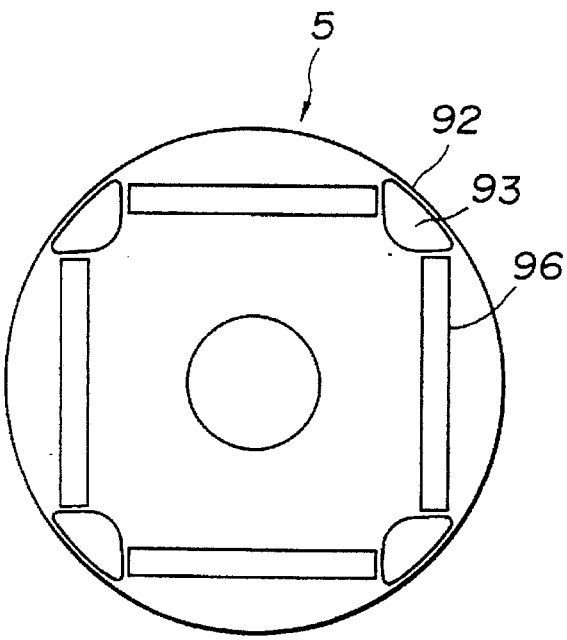
FIG. 32 is a plan view of the embodiment shown in FIG. 31.

FIG. 31 is a partially sectional view of a still further embodiment of the rotor of an electric motor for a compressor according to the present invention, and FIG. 32 is a plan view thereof.

A rotor core 91 incorporating the rotor 5 is composed of a plurality of laminated iron plates. A U-shaped space 93 with the top portion closed by a thin bridge 92 is formed in each iron plate between adjacent salient pole portions.

The reference numeral 94 represents a first end surface member attached to one end of the rotor core 91, and 95 a second end surface member attached to the other end of the rotor core 91. The reference numeral 96 denotes a magnetic material composed of a permanent magnet.

According to this structure, although the rotor 5 has a salient pole structure, since there is no notched portion on the outer periphery, in the case of rotating the motor in a liquid as an electric motor for a compressor, the rotation resistance is reduced to a minimum. Since the notched portion (space 93) is connected by the thin bridge 92, the magnetic short circuit between the poles is negligible.

Figure 33:
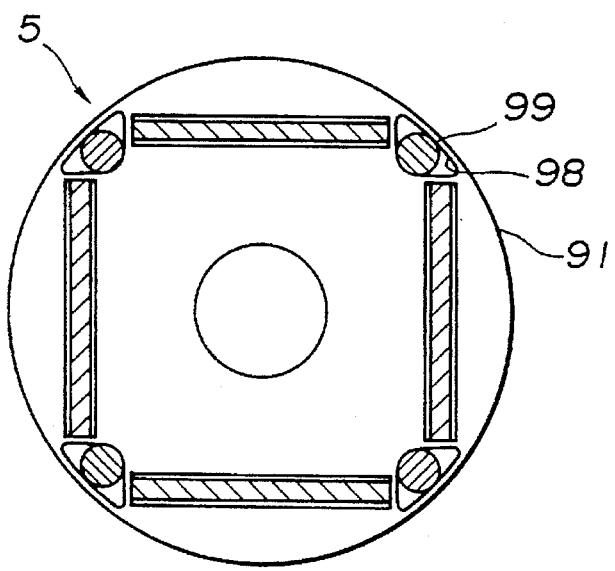
FIG. 33 is a plan view of a modification of the rotor core shown in FIG. 31.

FIG. 33 is a plan view of a modification of the rotor core shown in FIG. 31. A top-closed U-shaped space 98 similar to the space 93 is formed, and a caulking pin 99 of a nonmagnetic material for integrally bonding the rotor core 91 and the upper and lower end surface members (not shown) is passed through the space 98.

According to this structure, since the caulking pin 99 is inserted into the space 98, a through hole for passing a caulking pin therethrough is obviated, and the magnetic resistance and the core loss at this portion are reduced, thereby enabling the increase in the efficiency of the motor.

Figure 34:
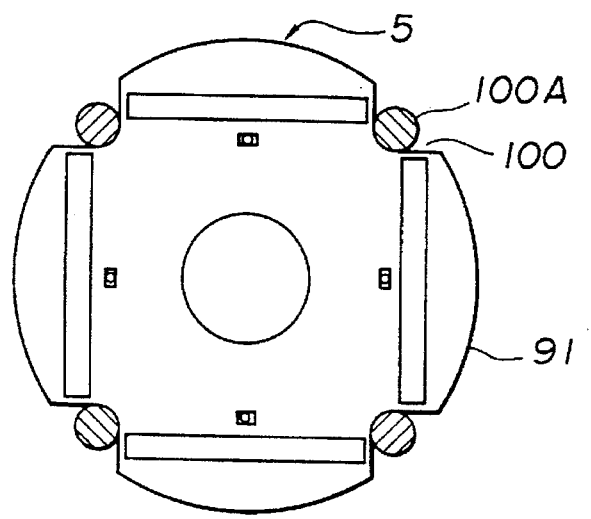
FIG. 34 is a plan view of another modification of the rotor core shown in FIG. 31.
Figure 35:
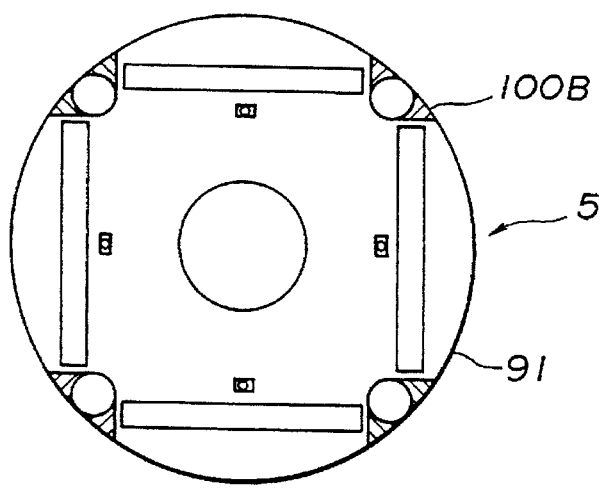
FIG. 35 is a plan view of still another modification of the rotor core shown in FIG. 31.
Figure 36:
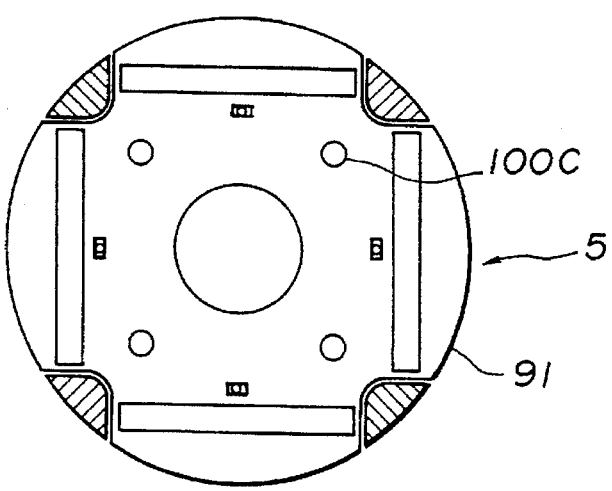
FIG. 36 is a plan view of a further modification of the rotor core shown in FIG. 31.

FIGS. 34 to 36 are plan views of other modifications of the rotor core shown in FIG. 31. In each of these rotor cores, a U-shaped portion between the salient pole portions is filled with a caulking pin for integrally caulking the rotor core 91 and the upper and lower end surface members (not shown) and/or a nonmagnetic filler in place of closing the top portion with the thin bridge 92.

In FIG. 34, nonmagnetic caulking pins 100A are passed through the U-shaped notched portion 100 on the outer periphery of the rotor core 91. In FIG. 35, the notched portion 100 in FIG. 34 are filled with nonmagnetic fillers 100B. In FIG. 36, the notched portions 100 on the outer periphery of the rotor core 91 are filled with the nonmagnetic fillers 100B, and caulking holes 100C for integrally caulking the rotor core 91 and the upper and lower end surface members (not shown) are provided.

Figure 37:
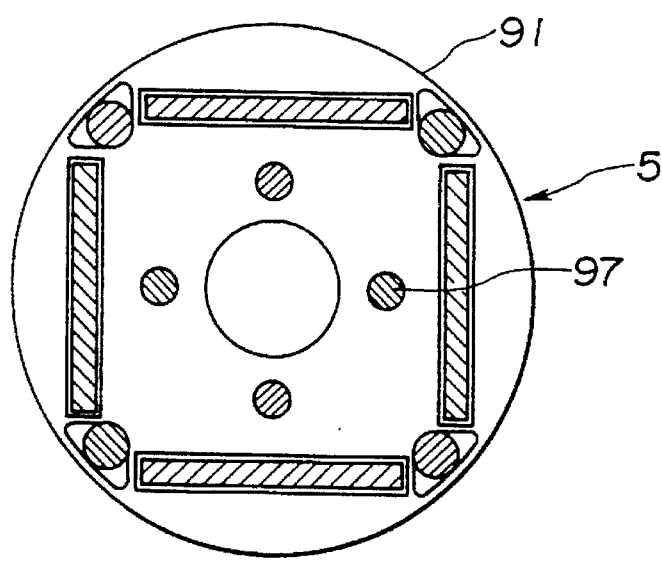
FIG. 37 is a plan view of a still further modification of the rotor core shown in FIG. 31.

FIG. 37 is a plan view of a still further modification of the rotor core shown in FIG. 31. The rotor core in FIG. 33 is the same as the rotor core 91 shown in FIG. 33 except that the inner peripheral portion of the rotor core 91 is further caulked by caulking pins 97.

According to these structures shown in FIG. 32 to 37, since the U-shaped portion is filled with a nonmagnetic caulking pin for integrally caulking the rotor core and the upper and lower end surface members and/or a nonmagnetic filler in place of closing the top portion with the thin bridge, a through hole for passing a caulking pin therethrough is obviated, and the magnetic resistance and the core loss at this portion are reduced, thereby enabling the increase in the efficiency of the motor.

Figure 38:
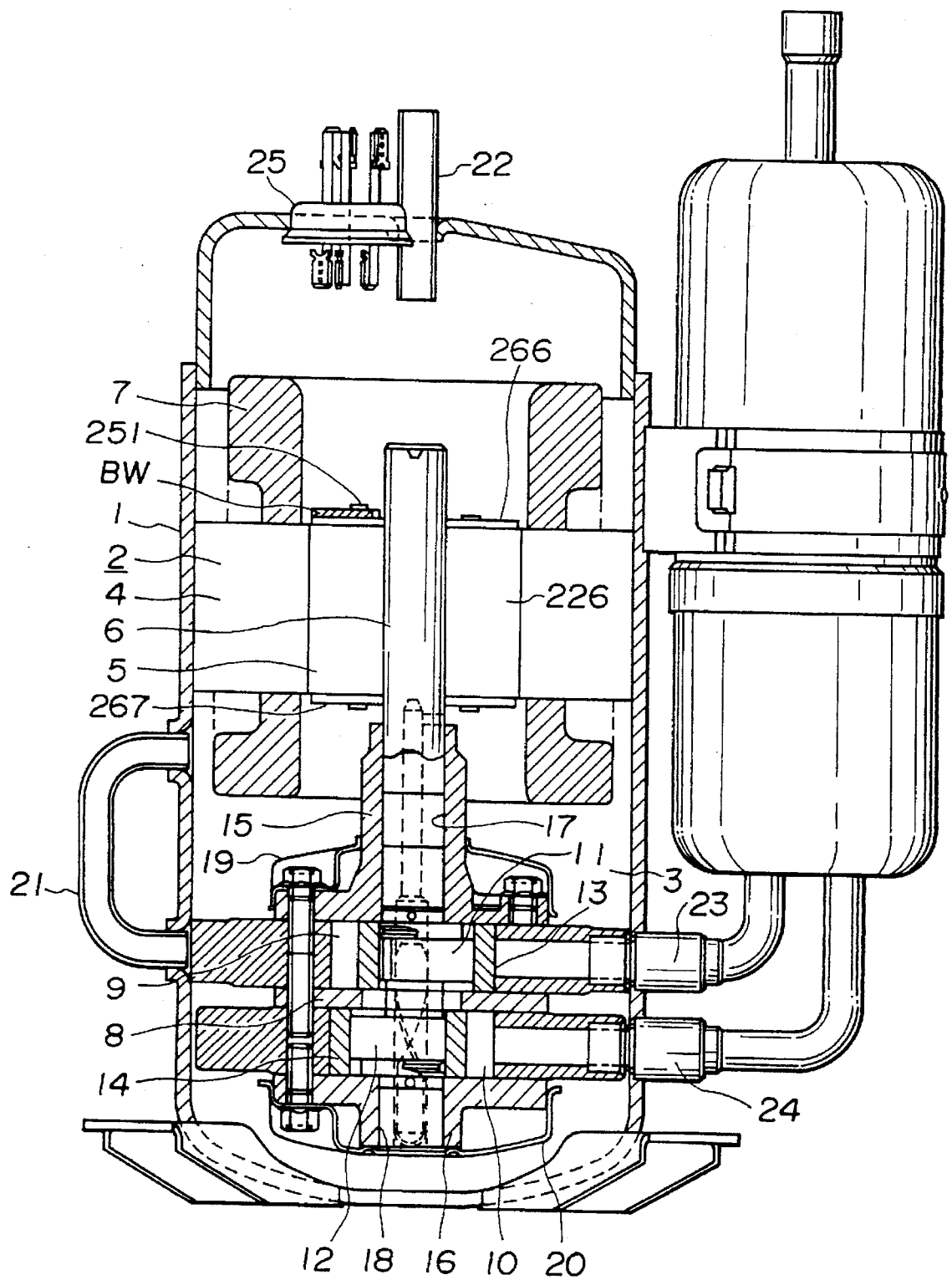
FIG. 38 is another example of a compressor incorporating a still further embodiment of the rotor of an electric motor according to the present invention.

FIG. 38 is another example of a compressor incorporating a still further embodiment of the rotor of an electric motor according to the present invention. The same reference numerals are provided for the element which are the same as those in FIG. 1 and explanation thereof will be omitted.

Figure 39:
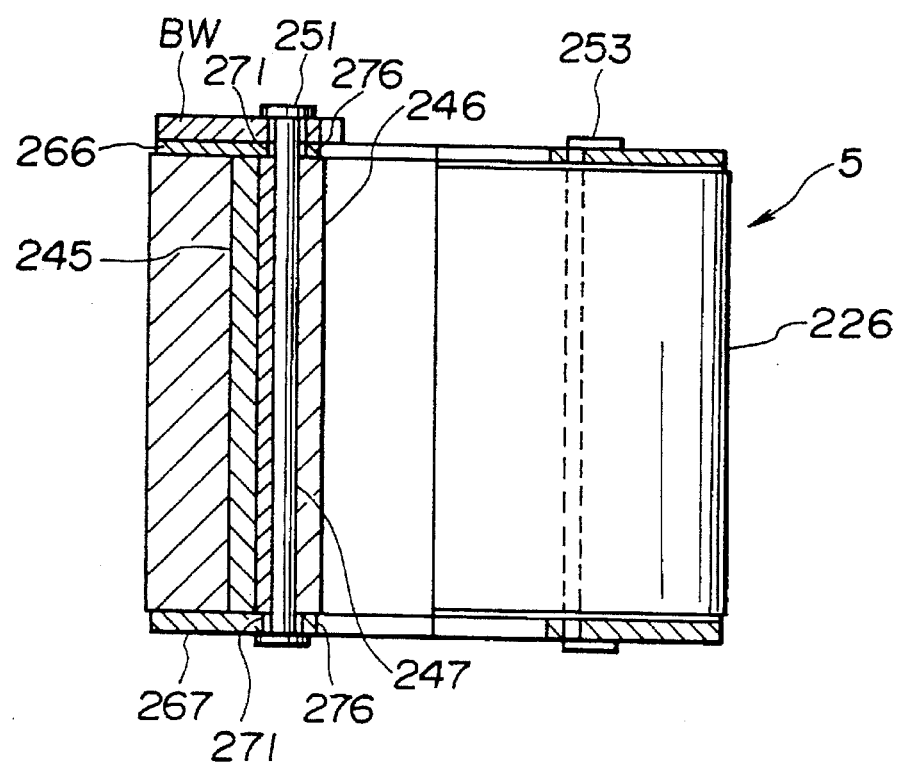
FIG. 39 is a partially sectional view of the embodiment of the rotor shown in FIG. 38.
Figure 40:
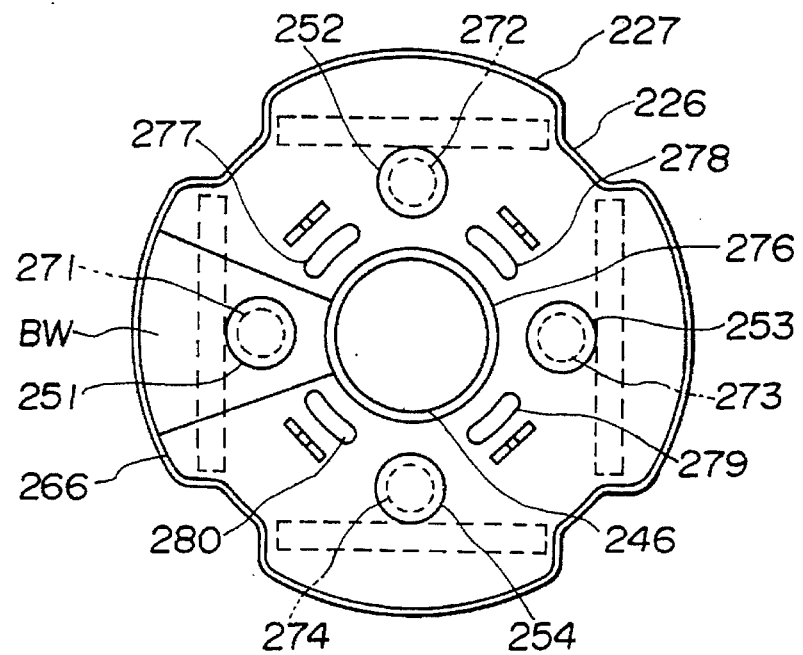
FIG. 40 is a plan view of the embodiment shown in FIG. 39.
Figure 41:
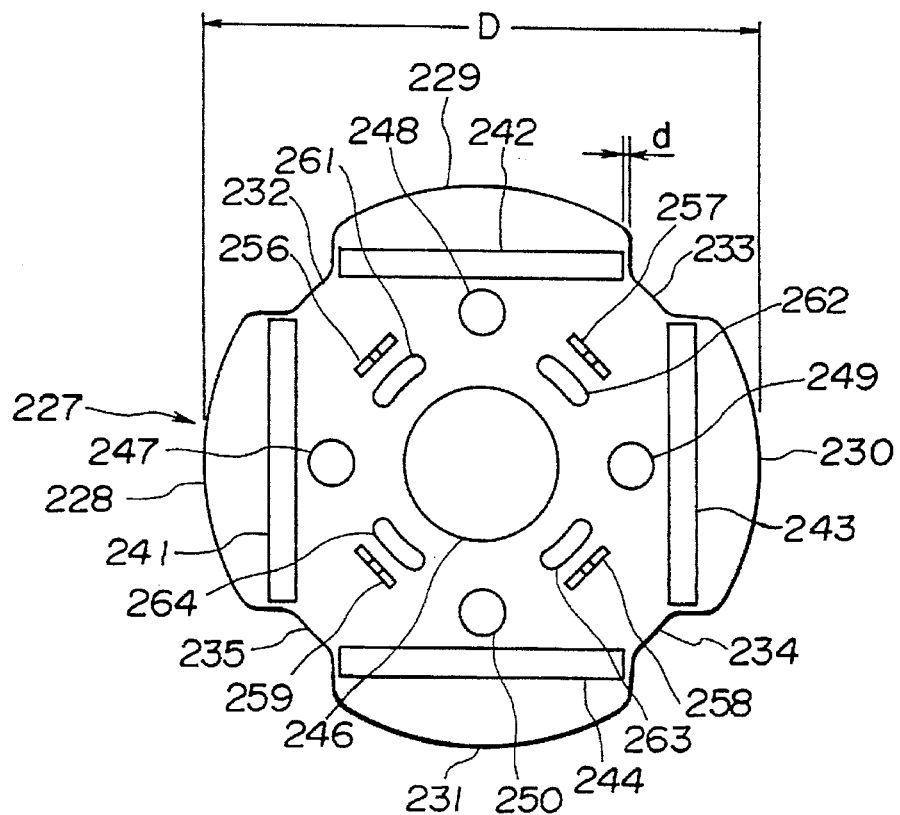
FIG. 41 is a plan view of the electromagnetic steel plates (iron plates for the rotor) used for the rotor core shown in FIG. 39.

FIG. 39 is a partially sectional view of the rotor shown in FIG. 38, and FIG. 40 is a plan view thereof before the rotary shaft 6 is press-fitted thereinto. In each of the drawings, the reference numeral 226 denotes a rotor core which is composed of a plurality of laminated iron plates 227 each having a thickness of 0.3 to 0.7 mm and punched from an electromagnetic steel plate into a predetermined shape as shown in FIG. 41. The iron plates 227 are caulked with each other and integrally laminated. Alternatively, the iron plates 227 may be integrally bonded by welding the outer peripheral surfaces.

The iron plate 227 is punched from an electromagnetic steel plate in to a shape which can form salient pole portions 228 to 231 constituting four magnetic poles, as shown in FIG. 41. The reference numerals 232 to 235 denote notched portions between the respective salient pole portions 228 to 231.

The outer diameter D of the iron plate 277 (the distance between the tops of each pair of salient pole portions) is 40 to 70 mm. In this embodiment, it is 50 mm.

The reference numerals 241 to 244 denote slots into which later-described magnetic materials 245 (permanent magnets) are press-fitted. The slots 241 to 244 are formed in the iron plate 227 on the outer peripheral side thereof on a concentric circle with the rotary shaft 6 in correspondence with the respective salient pole portions 228 to 231. The distance d between each of the slots 241 to 244 and the adjacent side wall of the respective salient pole portions 228 to 231 is preferably as small as possible.

In this way, since the outer diameter D of the rotor core 226 is set to 40 to 70 mm and the distance d between each of the slots 241 to 244 and the respective salient pole portions 228 to 231 is set to be as small as possible, it is possible to reduce the magnetic flux leakage between the magnetic poles (magnetic materials 245) while maintaining the strength of the rotor core 226, thereby enhancing the operation efficiency of the electric motor 2.

The reference numeral 246 represents a shaft hole which is formed at the center of the iron plate 227 so as to shrink fit the rotary shaft 6 thereinto. The reference numerals 247 to 250 represent through holes formed on the inside of the respective slots 241 to 244 through which later-described caulking rivets 251 to 254, respectively, are passed. Each of the through holes 247 to 250 has appropriate size and shape corresponding to the respective caulking rivets 251 to 254. The reference numerals 256 to 259 represent caulking portions for caulking and fixing the iron plates 227 with each other. The caulking portions 256 to 259 are provided on an approximately concentric circle with the circle on which the through holes 247 to 250 are provided and between the respective slots 241 to 244. The reference numerals 261 to 264 represent holes formed on the inside of the respective caulking portions 256 to 259 so as to form oil passages.

Figure 42:
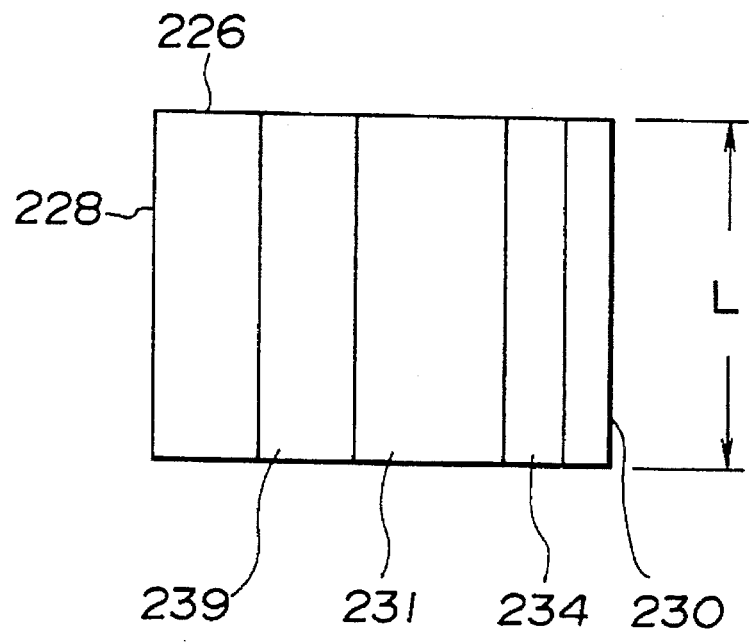
FIG. 42 is a side elevational view of the rotor core which is incorporated into the embodiment shown in FIG. 39.

A plurality of iron plates 227 are laminated and integrally caulked at the caulking portions 256 to 259, thereby producing the rotor core 226 which is shown in the side elevational view in FIG. 42. The outer diameter of the rotor core 226 is the outer diameter D (50 mm) of the iron plate 227 and the dimension L of lamination is, for example, 40 mm. The ratio L/D of the outer diameter D of the iron plate 227 and the dimension L of lamination is less than 1.1. In this embodiment, the ratio L/D is 0.8. That is, the dimension of the rotor core 226 in the direction of the rotary shaft 6 is set to be a smaller value.

Figure 43:
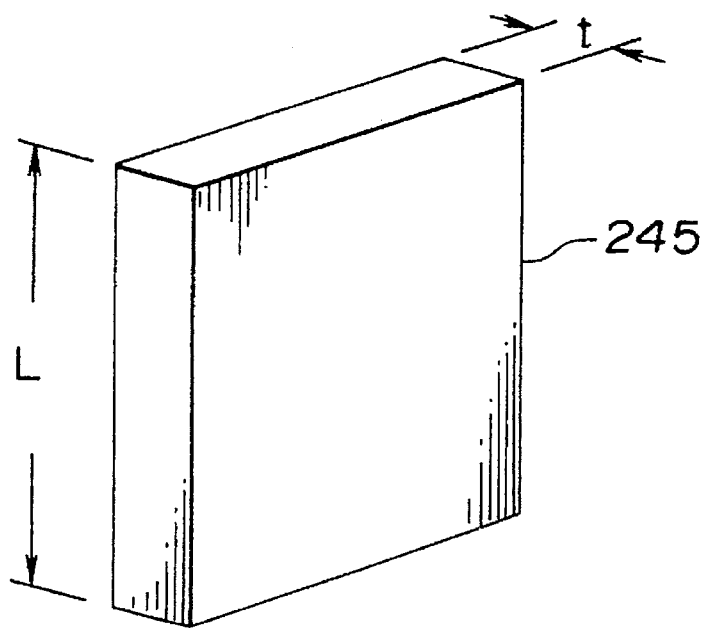
FIG. 43 is a perspective view of a magnetic material which is incorporated into the embodiment shown in FIG. 39.

The magnetic material 245 is composed of a magnet of a rare earth element such as a praseodymium magnet (alloy of praseodymium and iron) or a neodymium magnet (alloy of neodymium and iron) plated with nickel. The magnetic material 245 has a rectangular section and takes a shape of a plate as a whole, as shown in FIG. 43. The dimension of the magnetic material 245 in the direction of the rotary shaft 6 is the same as L. The size of each of the slots 241 to 244 is determined so that the magnetic material 245 is tightly press-fitted thereinto.

Figure 44:
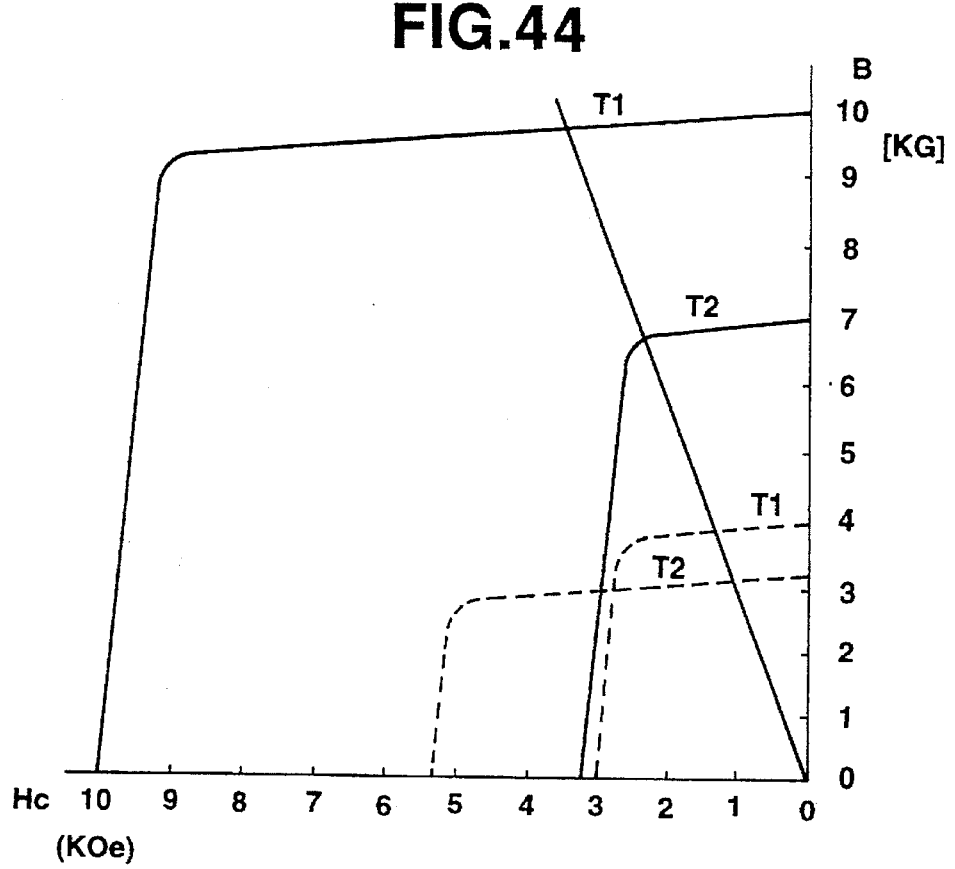
FIG. 44 shows the demagnetization curves of the permanent magnet used as the magnetic material in FIG. 43 as compared with the demagnetization curves of a ferrite magnet.

FIG. 44 shows the demagnetization curve of a ferrite magnet and the demagnetization curve of a rare-earth magnet such as described above which is a permanent magnet used as the magnetic material 245 in FIG. 43. The ordinate represents the flux density B and abscissa a coercive force Hc. A broken line is a demagnetization curve of a general ferrite magnet and a solid line is a demagnetization curve of a general rare-earth magnet. A line T1 represents the values measured at +25° C., and a line T2 at +150° C.

As is clear from FIG. 44, the rare-earth magnet has a larger residual flux density Br and a larger coercive force Hc than the ferrite magnet. The magnetic energy product of the rare-earth magnet is also very large. It is therefore possible to secure the necessary gap flux and obtain the required output even if the area of the magnet is reduced.

The rotary shaft 6 is a cantilever type and supported only at the lower part by the bearings 17 and 18, as described above. Therefore, if the dimension of the rotary shaft 6 of the rotor 5 in the axial direction is increased, a large run-out is produced, especially, at the time of high-speed rotation, and with the increase in the vibration and noise, both the reliability and the operation efficiency are lowered.

In this embodiment, however, since the rare-earth magnet is used as the magnetic material 245 provided in the laminated rotor core 226, it is possible to reduce the size of the rotor core 226 while maintaining the necessary output as compared with a conventional rotor core using a ferrite magnet. As a result, it is possible to enhance the reliability and the operation efficiency by reducing the vibration and noise caused by the run-out of the rotor 5.

Especially, since the ratio L/D of the outer diameter D and the dimension L of the rotor core 226 in the direction of the rotary shaft 6 is reduced to less than 1.1, in other words, the reduction in the size of the rotor core 226 is realized by the reduction of the dimension of the rotor core 226 in the direction of the rotary shaft 6, it is not necessary to change the facility for producing the compressor, which would be required by a change in the diameter of the rotor core 226 or the outer diameter of the closed container 1 of the compressor.

Referring to FIG. 38 again, the reference numerals 266 and 267 represent flat end surface members which are attached to the upper and lower end of the rotor core 226. The end surface members 266 and 267 formed from a nonmagnetic material such as aluminum and a resin material have substantially the same shape as the iron plate 227. The outer diameter of the end surface members 266, 267 is smaller than the outer diameter D of the rotor core 226. Through holes 271 to 274 are formed in the end surface members 266, 267 at the corresponding positions to the through holes 247 to 250, and a shaft hole 276 and holes 277 to 274 are formed in the end surface members 266,267 at the corresponding positions to the shaft hole 246 and the holes 261 to 264, as shown in FIG. 40.

The shaft hole (inner diameter) 276 of the end surface members 266, 277 is larger than the shaft hole 246 (inner diameter) of the iron plate 227, and the diameter of each of the through holes 271 to 274 of the end surfaces 266, 267 is larger than the diameter of each of the through holes 247 to 250 of the iron plate 227.

After the magnetic materials 245 are press-fitted into the slots 241 to 244 of the rotor core 226, the upper and lower end surface members 266 and 267 are set so as to cover the tops and the bottoms of the slots 241 to 244. In this state, the through holes 247 to 250 in the iron core 226 and the through holes 271 to 174 in the upper and lower end surface members communicate with each other in the direction of the rotary shaft 6. Thereafter, the rivets 251 to 254 are passed through the respective through holes 247 to 250 and 271 to 274 so as to integrally caulk the upper portion and the lower portion of the laminate and produce the rotor 5. The rotary shaft 6 is then inserted into the shaft hole 246, and the rotor 5 and the rotary shaft 6 are fixed by shrink fitting. The symbol BW represents a balance weight which is fixed to the rotor core 226 by the rivet 251 together with the upper end surface member 266.

In this manner, since the rotor 5 is integrally assembled before the rotary shaft 6 is press-fitted thereinto, it is possible to maintain the high dimensional accuracy of the rotor 5. In addition, since the end surface members 266, 277 composed of a nonmagnetic material are used for the purpose of integral assembly of the rotor core 226, there is no secondary conductor constituted by a metal pipe or a die-cast material, thereby preventing the generation of an eddy current caused thereby. Furthermore, since the outer diameter of the end surface members 266, 267 is smaller than the outer diameter D of the rotor core 226, and the shaft hole 276 (inner diameter) of the end surface members 266, 267 is larger than the shaft hole 246 (inner diameter of the rotor core 226) of the iron plate 227, when the end surface members 266, 267 are attached to the rotor core 226, the end surface members 266, 267 do not protrude to the outside of the rotor core 226 or to the inside of the shaft hole 246 of the rotor core 226.

In addition, since the diameter of each of the through holes 271 to 274 is larger than the diameter of each of the through holes 247 to 250 of the iron plate 227, even if there is a slight error in alignment of the through holes 271 to 274 with the through holes 247 to 250, there is no trouble in inserting the rivets 251 to 254.

Therefore, the machining tolerance in each of the outer and inner diameters of the end surface members 266, 267 and the diameter of each of the through holes 271 to 271 may not be very strict. It is also easy to align the inner peripheries, the outer peripheries of the end surface members and the through holes at the time of assembling the end surfaces 266, 267 and the rotor core 226.

Figure 45:
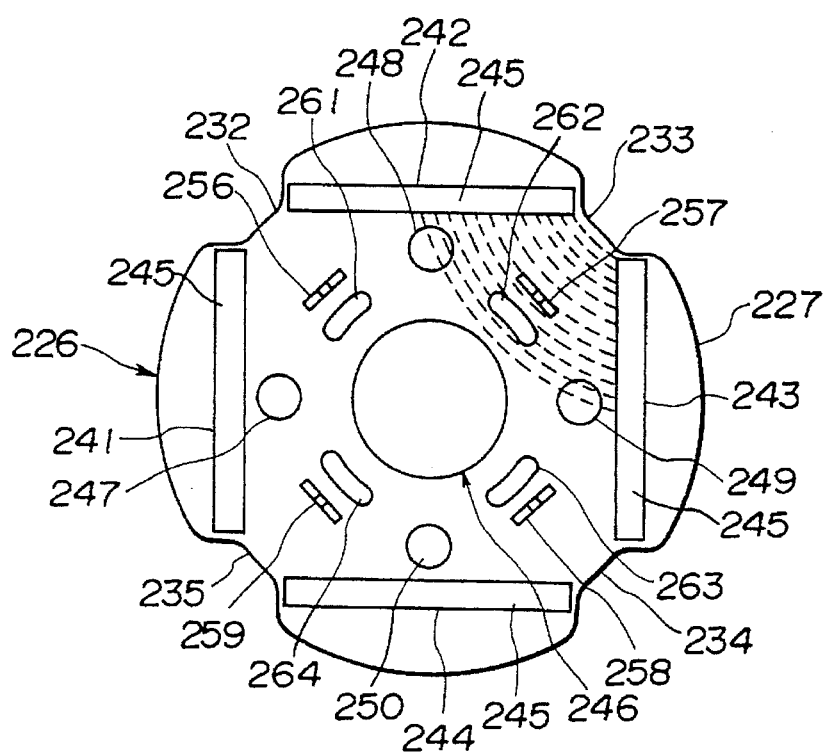
FIG. 45 is a plan view of the rotor core shown in FIG. 42, explaining the magnetic field generated by the magnetic materials.

The state of the magnetic field generated within the rotor core 226 by each of the magnetic materials 245 is shown in FIG. 45. A substantially concentric magnetic field around the notched portion 233 is generated between the magnetic materials (magnetic poles) 245 which are press-fitted into the adjacent slots 242, 243, for example, as indicated by the broken lines. A similar magnetic field is generated between the other adjacent magnetic material 245.

Since the through holes 247 to 250 are formed in correspondence with the inner walls of the respective magnetic materials 245, each of the through holes 247 to 250 as a gap is positioned not at the center but at the peripheral portion of the magnetic paths leading to one magnetic material 245 to the adjacent magnetic material 245. Therefore, the through holes 247 to 250 are unlikely to become a magnetic resistance to the magnetic field produced. It is therefore unlikely to generate a disturbance in the magnetic field, so that it is possible Go hold down the deleterious influence of the through holes 247 to 250 on the electric motor 2 to the minimum and increase the output of the electric motor 2.

Since the caulking portions 256 to 259 and the holes 261 to 264 of each of the iron plates 227 are disposed between the through holes 247 to 250, it is possible to position the caulking portions 256 to 259 on the outer peripheral side of the rotor core 226, as shown in FIG. 41. It is therefore possible to increase the fixing strength of the iron plates 227 by caulking. Although the caulking portions 256 to 259 and the holes 261 to 264 are situated at the center of the magnetic field, since the caulking portions 256 to 259 and the holes 261 to 164 are minimal gaps compared with the through holes 247 to 250, the influence thereof on the magnetic field is small.

Figure 47:
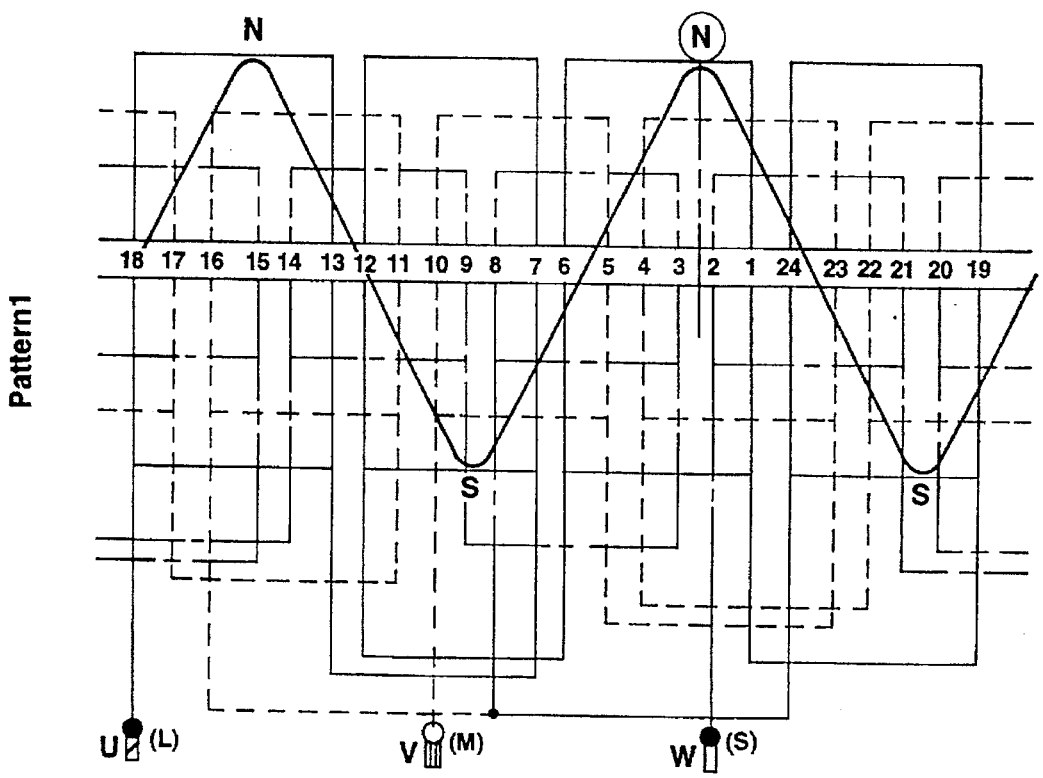
FIG. 47 shows the connection diagrams of the stator coil showing the distribution of the magnetic field on the inner periphery of the stator in the patterns 1 to 2 in FIG. 46.
Figure 47:
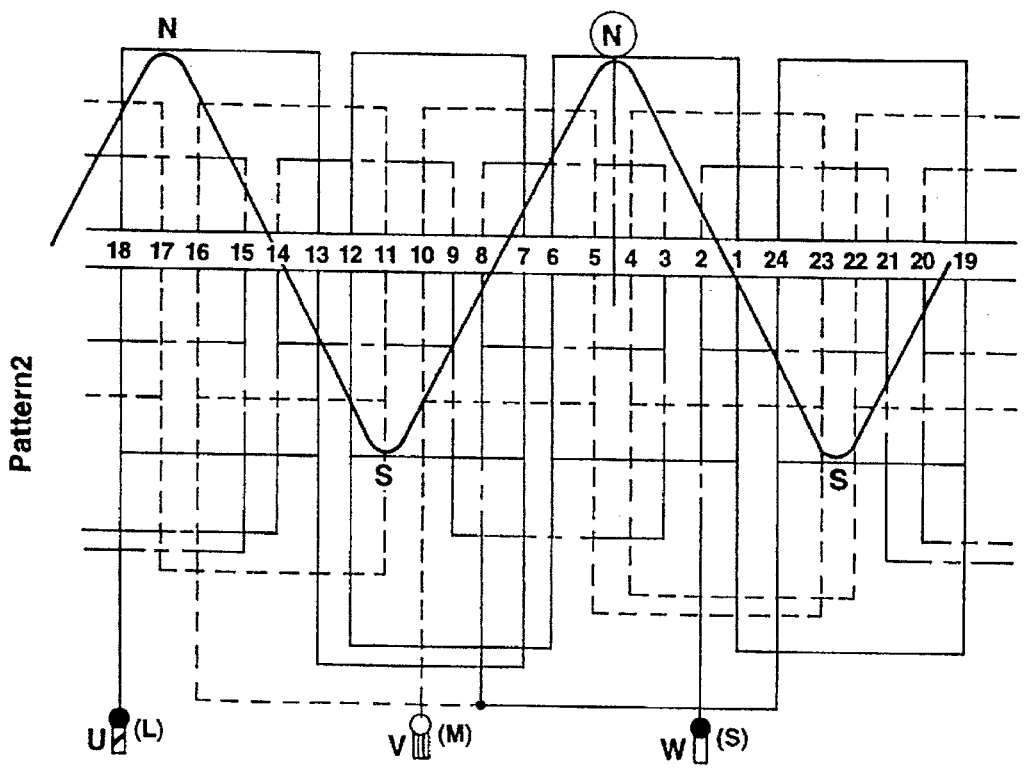
Figure 48:
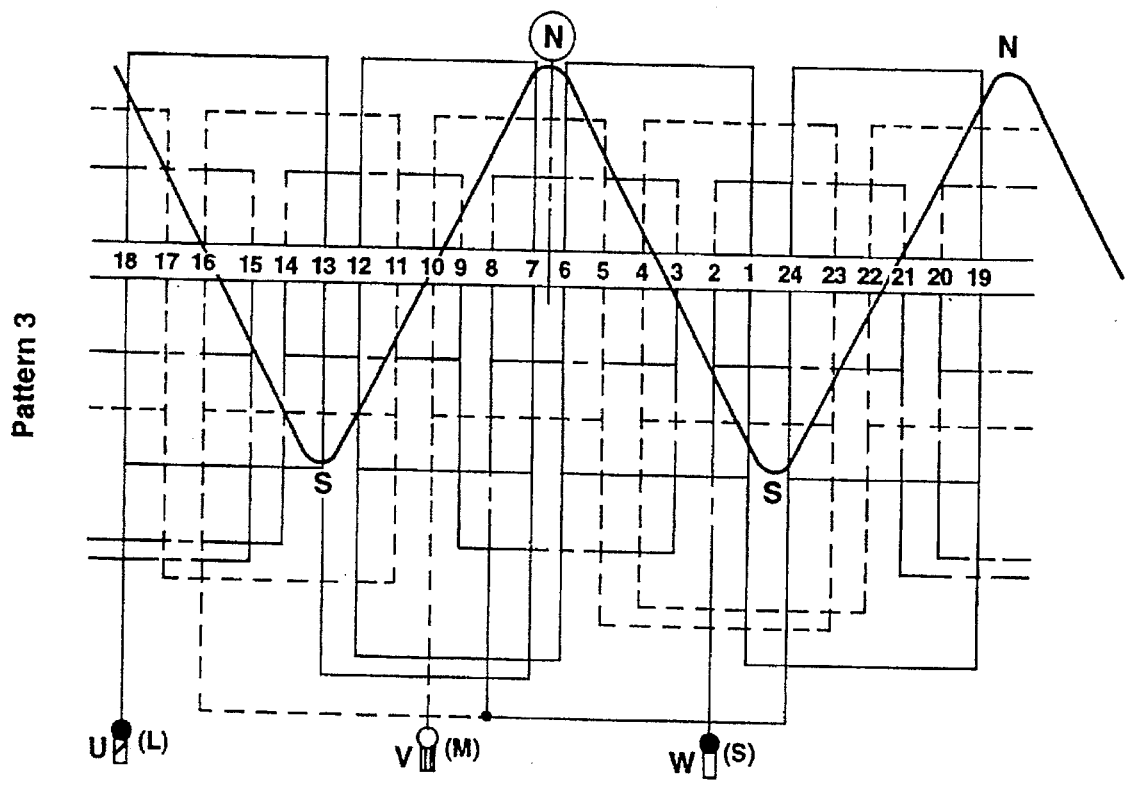
FIG. 48 shows the connection diagrams of the stator coil showing the distribution of the magnetic field on the inner periphery of the stator in the patterns 3 to 4 in FIG. 46.
Figure 48:
Figure 48:
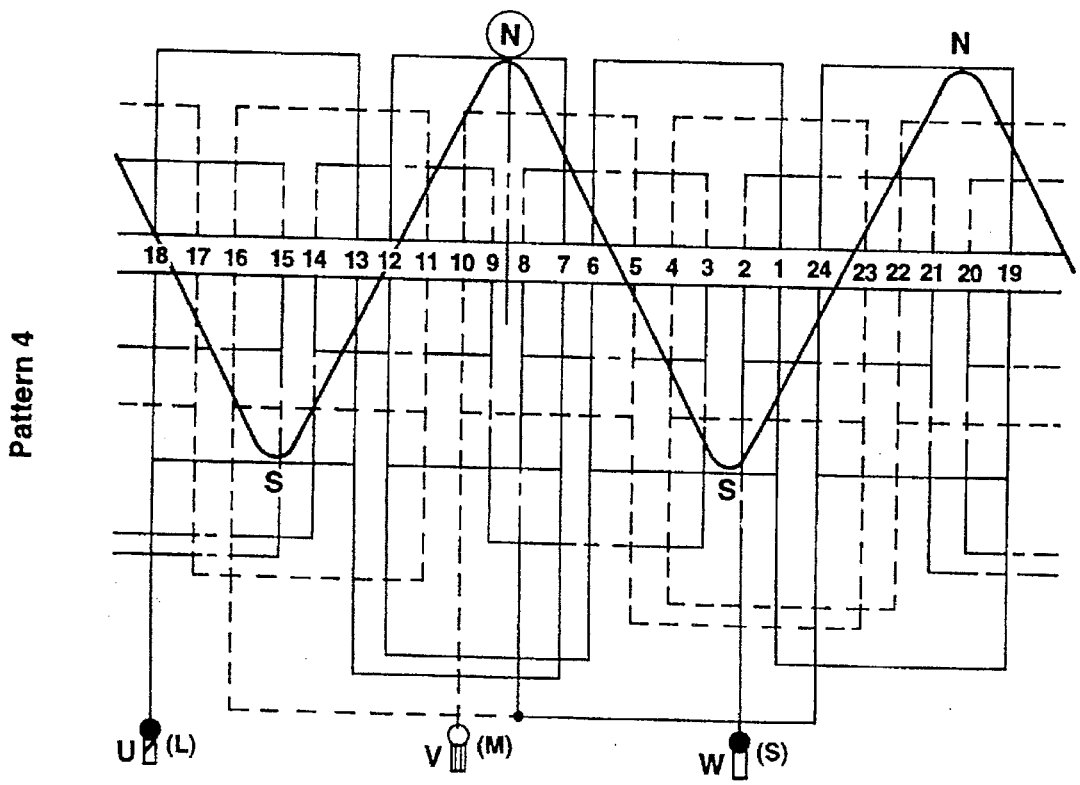
Figure 49:
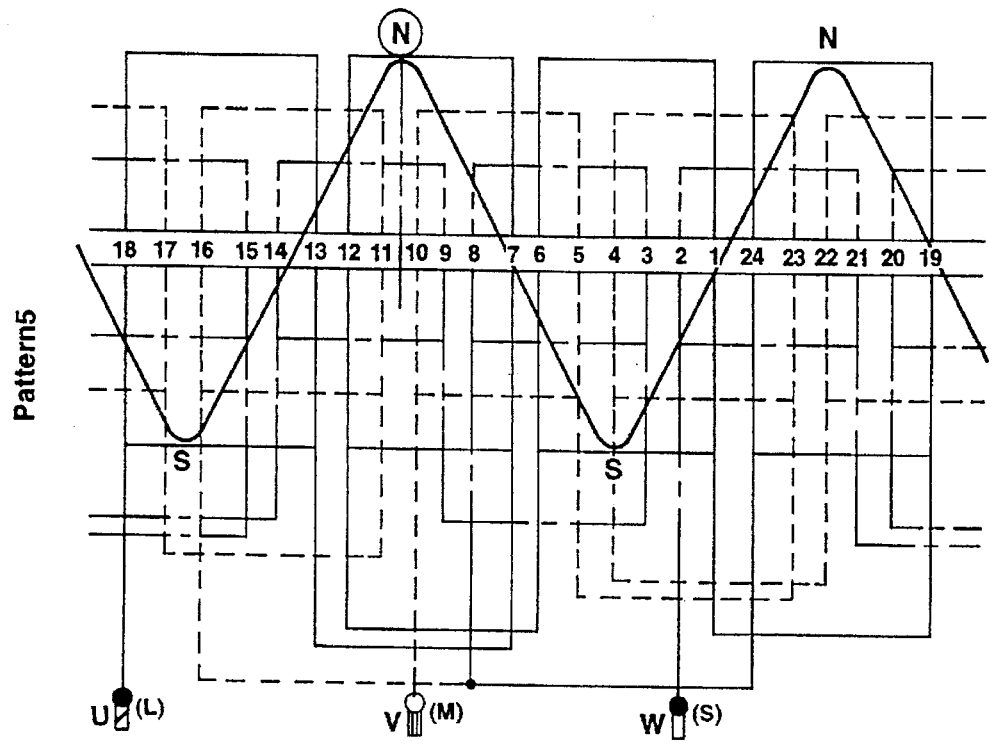
FIG. 49 shows the connection diagrams of the stator coil showing the distribution of the magnetic field on the inner periphery of the stator in the patterns 5 to 6 in FIG. 46.
Figure 49:
Figure 49:
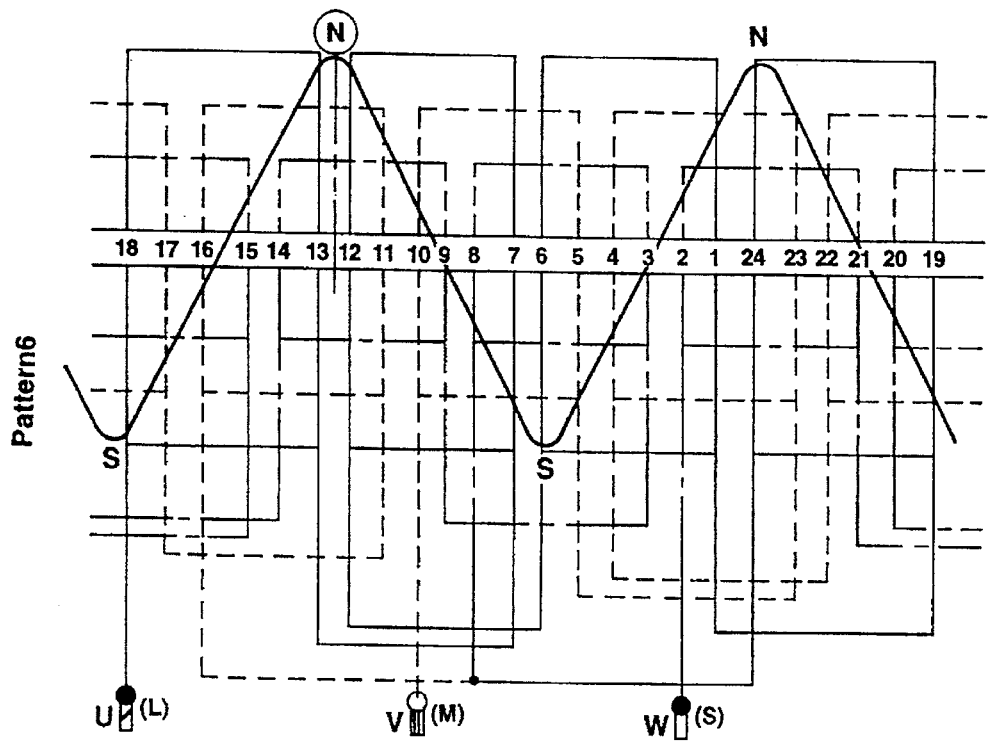
Figure 50:
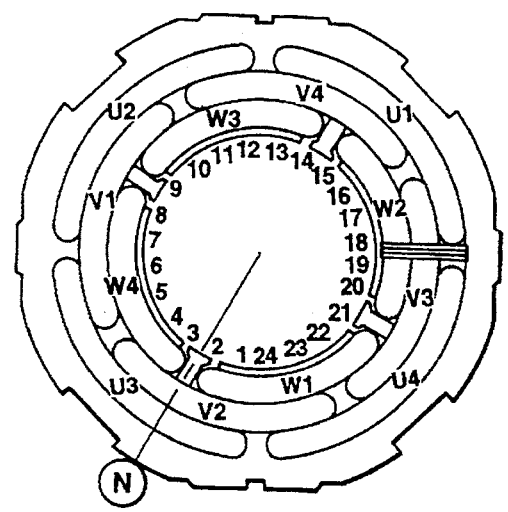
FIG. 50 is a plan view of the stator showing the distribution of the magnetic field on the inner periphery of the stator in each of the patterns 1 to 4 in FIG. 46.
Figure 50:
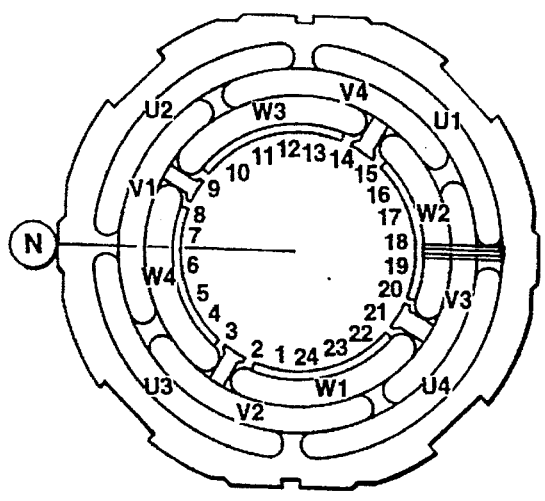
Figure 50:
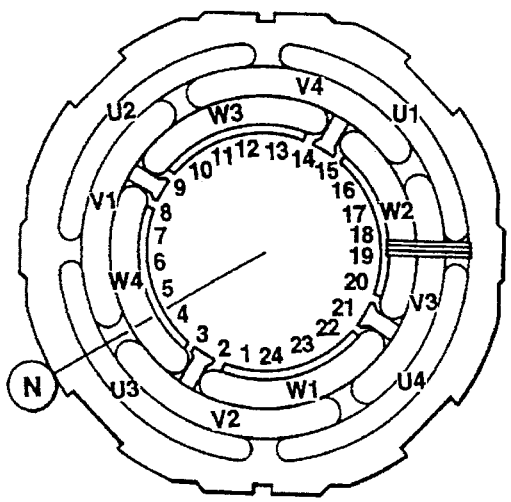
Figure 50:
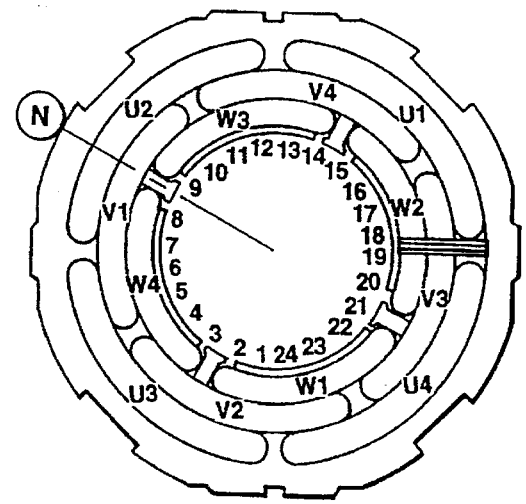
Figure 51:
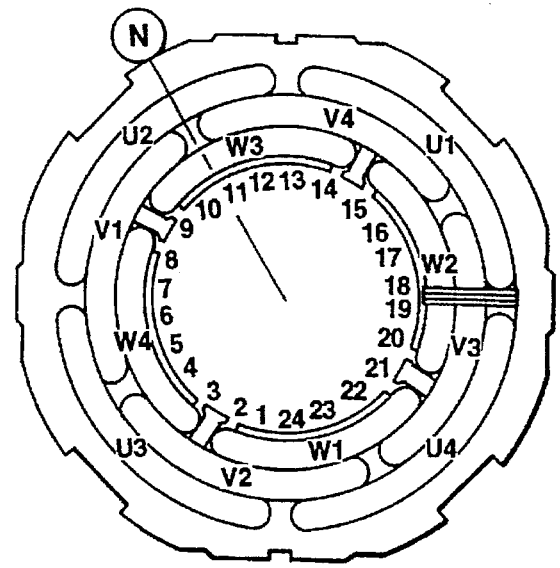
FIG. 51 is a plan view of the stator showing the distribution of the magnetic field on the inner periphery of the stator in each of the patterns 5 to 6 in FIG. 46.
Figure 51:
Figure 51:
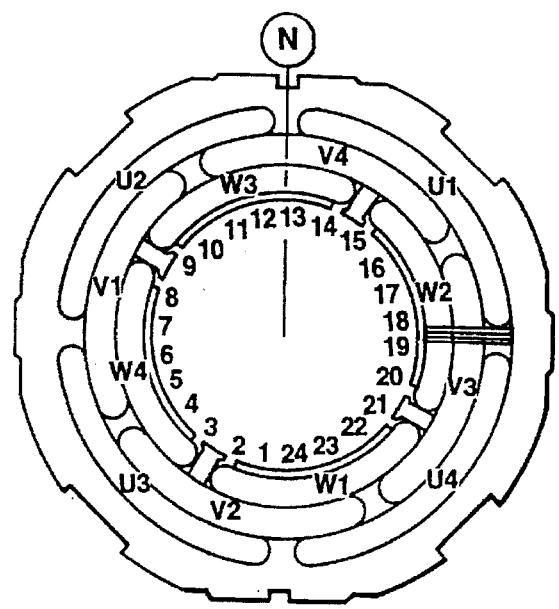

The operation of the electric motor 2 in this embodiment will now be explained with reference to FIGS. 46 to 51. FIGS. 47 to 49 are connection diagrams of the stator coil 7, and FIGS. 50 and 51 are plan views of the stator 4. The stator coil 7 disposed around the rotor 5 is a three-phase coil composed of an outer winding of a phase U, an intermediate winding of a phase V and an inner winding of a phase W, each of which constitutes four poles U1 to U4, V1 to V4 and W1 to W4, as shown in FIGS. 50 and 51.

Figure 46:
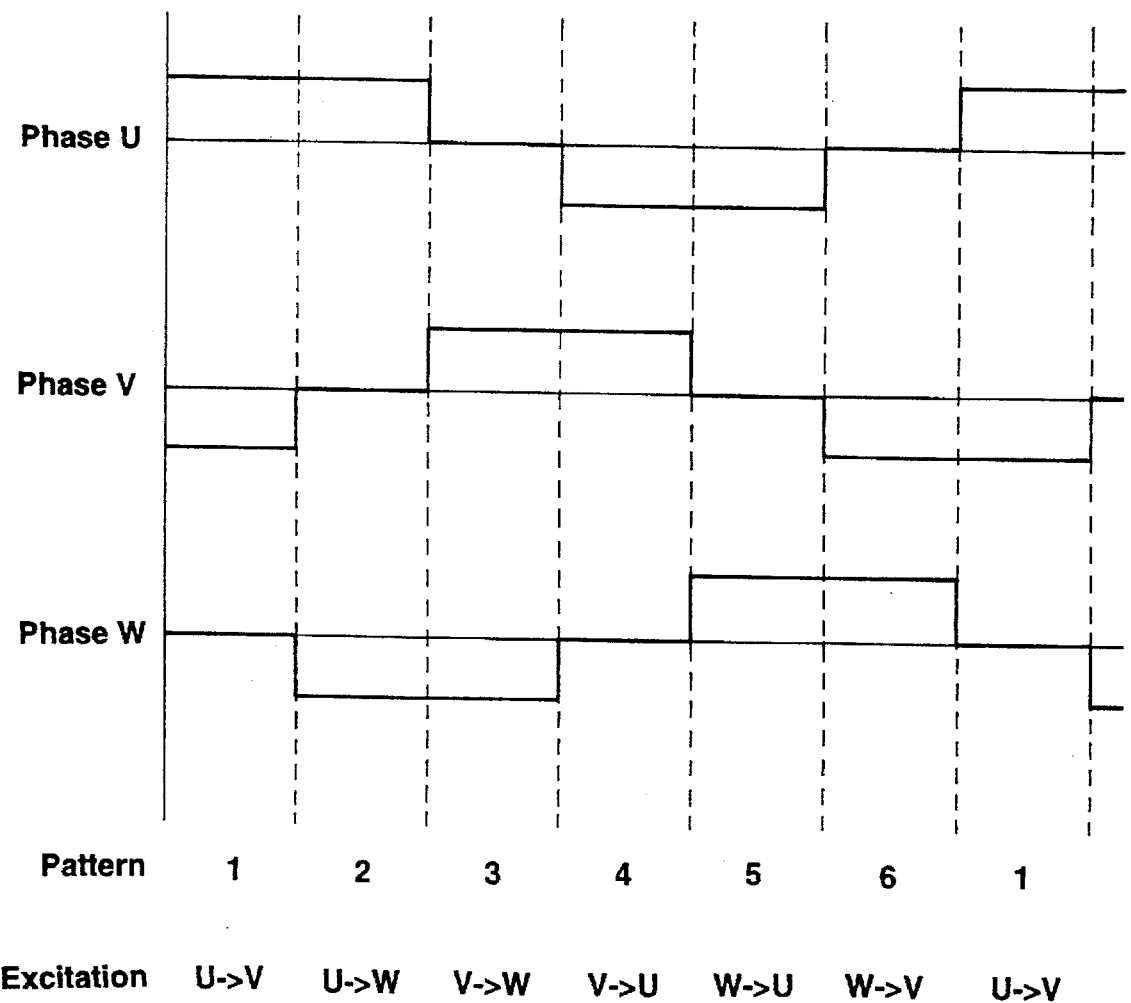
FIG. 46 is a timing chart of the excitation patterns of the stator coil in the compressor shown in FIG. 38.

A direct current is supplied to each of the U-phase winding, the v-phase winding, the W-phase winding of the stator coil 7 in the order of a pattern i to a pattern 6 by a controller (not shown) such as an inverter which is composed of a plurality of switching elements, e.g., transistors, as shown in FIG. 46. The distributions of the magnetic fields (synthesized magnetic field) on the inner periphery of the stator 4 generated when the stator coil 7 is excited in the patterns from 1 to 6 are shown in the connection diagrams in FIGS. 47 to 49.

The same pattern number in each drawing refers to the same pattern, and the symbol encircled N in FIGS. 50 and 51 corresponds to the symbol encircled N in FIGS. 47 to 49. In this embodiment, it is assumed that the magnetic materials 245 inserted into the slots 241 and 243 are N poles and the magnetic materials 245 inserted into the slots 242 and 244 are S poles, and that the controller excites the stator coil 7 every time the salient pole portions 228 to 231 (magnetic materials 245 therein) of the rotor 5 push each other by the repulsion of the same poles.

When the pattern 1 is shifted to the pattern 2, the magnetic field rotates 30 degrees. Accordingly, when the excitation proceeds from the pattern 1 to the pattern 6, the magnetic field rotates 180 degrees, and two periods of synthesized magnetic field exists in 360 degrees, as shown in the connection diagrams in FIGS. 47 to 49. The rotor 5 is rotated (that is, the rotor 5 also rotates 30 degrees in one pattern) clockwise in FIG. 41, as described above, by the repulsion of the synthesized magnetic field and the magnetic field generated by each magnetic material 245 at a rate at which the voltage and the load applied to the stator coil 7 are balanced (variable in the range of, for example, 500 to 10000 rpm by changing the voltage applied). The rotary shaft 6 also rotates with the rotation of the rotor 5, and the eccentric portions 11 and 12 also rotate, so that the first and second rollers 13, 14 rotate, thereby executing the compressing operation.

Although the magnetic material 245 and the slots 241–244 have a rectangular section in this embodiment, they are not restricted to these shapes and they may have a fan-shaped section of a predetermined width or a segmental section.

Figure 52:
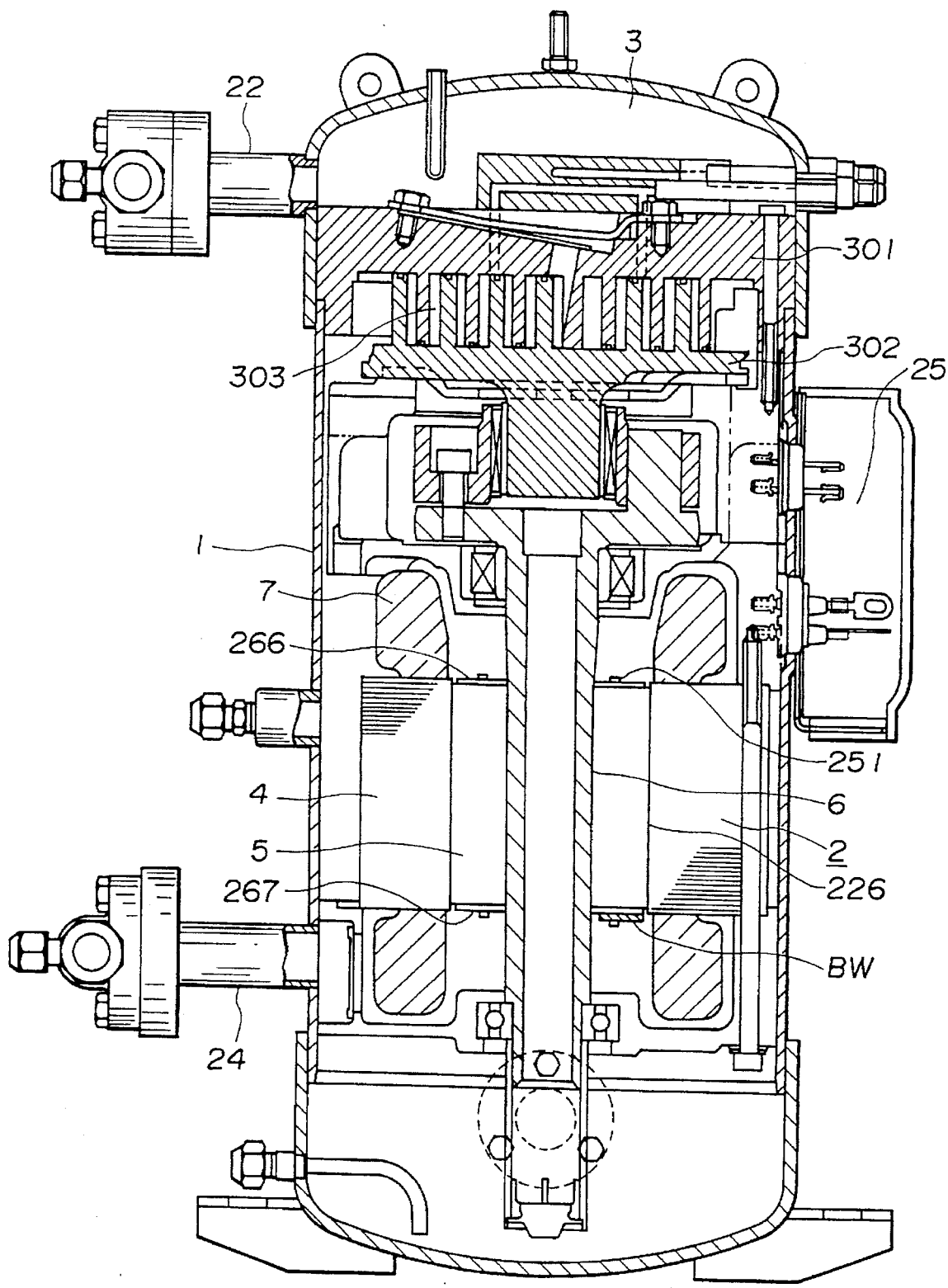
FIG. 52 is a sectional view of still another example of a compressor incorporating the rotor of an electric motor according to the present invention.

The above-described embodiments of the rotor are applied to the electric motor for a rotary compressor, but the application of the rotor of the present invention is not restricted thereto. The rotor of an electric motor of the present invention is also effective for a scroll compressor such as that shown in FIG. 52. FIG. 52 is a sectional view of a scroll compressor which can adopt each of the above-described embodiments of the rotor of an electric motor according to the present invention. The same reference numerals are provided for the element which are the same as those in FIGS. 1 and 38, and explanation thereof will be omitted.

The closed container 1 accommodates an electric motor 2 in the lower part and the compressing element 3 driven by the electric motor 2 in the upper part.

The electric motor 2 is composed of the stator 4 fixed to the inner wall of the closed container 1 and the rotor 5 supported by the inside of the stator 4 in such a manner as to be freely rotatable around the rotary shaft 6. The stator 4 is provided with the stator coil 7.

The compressing element 3 is composed of a fixed scroll 301 and a rotary scroll 302. The fixed scroll 301 is disposed at the highest portion in the container 1 and the peripheral portion thereof is fixed to the closed container 1 by shrink fitting. The rotary scroll 302 is opposed to the fixed scroll 301 and a refrigerant compression chamber 303 is formed between the fixed scroll 301 and the rotary scroll 302. The rotary scroll 302 rotates with the rotation of the rotary shaft 6 of the electric motor 2.

The refrigerant sucked from the suction pipe 24 is sucked by the refrigerant compression chamber 303, and as the compression chamber 303 is gradually contracted toward the center with the rotation of the rotary scroll 302, the refrigerant is compressed and discharged from the discharge pipe 22.

In this case, the rotor core 226 of the rotor 5 is composed of a plurality of integrally laminated and caulked iron plates as in the rotor core 226 shown in FIG. 38. After the magnetic materials are press-fitted into the slots of the rotor core 226, the upper and lower end surface members 266 and 267 are set so as to cover the tops and the bottoms of the slots. In this state, the rivets 251 are passed through the respective through holes so as to integrally caulk the upper portion and the lower portion of the laminate and produce the rotor 5. The balance weight BW is fixed to the rotor core 226 by the rivet 251 together with the lower end surface member 267.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. A rotor of an electric motor for a compressor having a compressing element and an electric motor for driving said compressing element which are accommodated in a closed container, said rotor comprising:

a rotor core comprising a plurality of laminations of a material having magnetic properties;

a first end surface member of a nonmagnetic material disposed at one end of said rotor core and having a disk portion for oil separation and a balance weight portion;

a second end surface member of a nonmagnetic material disposed at the other end of said rotor core; and a plurality of fastener members which extend through said first end surface member, said rotor core, and said second end surface member to integrally fasten said rotor core, said first end surface member and said second end surface member.

2. A rotor of an electric motor for a compressor according to claim 1, wherein said rotor core is composed of a plurality of electromagnetic steel plates each having a thickness of not more than 0.5 mm which are integrally laminated.

3. A rotor of an electric motor for a compressor according to claim 1, wherein one of said first end surface member and said second end surface member is composed of at least one of a die-cast nonmagnetic metal material, a drawn nonmagnetic metal, and a resin material.

4. A rotor of an electric motor for compressor according to claim 1, further comprising a through hole into which said fastener member is inserted formed in each of said first and second end surface members and said rotor core, the through hole in at least one said end surface member having a larger diameter than the through hole in said rotor core.

5. A rotor of an electric motor for a compressor according to claim 1, further including at least four insertion holes provided in said rotor core on the outer peripheral side in the direction of the rotational axis;

magnetic materials inserted into said insertion holes; and a plurality of through holes in each of said first and second end surface members and in said rotor core on the inside of said insertion holes and into which said fastener members are inserted so as to integrally connect said end surface members and said rotor core; wherein laminations of iron plates are each provided with caulking portions for laminating and fastening said plurality of iron plates with each other, on an approximately concentric circle with the circle on which said plurality of through holes are provided and between the respective insertion holes.

6. A rotor of an electric motor for a compressor according to claim 5, further comprising a plurality of holes in each of said end surface members and said rotor core on the inside of said caulking portions to communicate with the corresponding holes in the direction of the rotational axis, said holes forming oil passages.

7. A rotor of an electric motor for a compressor according to claim 5 wherein at least one of said fastener members is a rivet.

* * * * *